(12) United States Patent
Kassas et al.

(10) Patent No.: US 11,187,774 B2
(45) Date of Patent: Nov. 30, 2021

(54) SDR FOR NAVIGATION WITH LTE SIGNALS

(71) Applicant: The Regents of the University of California, Oakland, CA (US)

(72) Inventors: Zak M. Kassas, Irvine, CA (US); Kimia Shamaei, Irvine, CA (US); Joe Khalife, Costa Mesa, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 294 days.

(21) Appl. No.: 16/335,976

(22) PCT Filed: Sep. 22, 2017

(86) PCT No.: PCT/US2017/053002
§ 371 (c)(1),
(2) Date: Mar. 22, 2019

(87) PCT Pub. No.: WO2018/125333
PCT Pub. Date: Jul. 5, 2018

(65) Prior Publication Data
US 2020/0025859 A1    Jan. 23, 2020

Related U.S. Application Data

(60) Provisional application No. 62/561,023, filed on Sep. 20, 2017, provisional application No. 62/398,403, filed on Sep. 22, 2016.

(51) Int. Cl.
*G01S 5/02*     (2010.01)
*B64C 39/02*    (2006.01)
*B64G 1/10*     (2006.01)
*G01S 5/14*     (2006.01)
(Continued)

(52) U.S. Cl.
CPC ............ *G01S 5/0221* (2013.01); *B64C 39/02* (2013.01); *B64G 1/1014* (2013.01); *G01S 5/145* (2013.01);
(Continued)

(58) Field of Classification Search
CPC .......... G01S 19/41; G01S 19/44; G01S 19/48; G01S 19/07; G01S 5/0221; G01S 5/145;
(Continued)

(56) References Cited

U.S. PATENT DOCUMENTS 7,839,329 B2    11/2010  Mao
2014/0140269 A1*  5/2014  Tavildar .............. H04W 56/002
                                                      370/328
(Continued)

FOREIGN PATENT DOCUMENTS

CN        109983307 A      7/2019

OTHER PUBLICATIONS

International Application Serial No. PCT/US2017/053002, International Search Report dated Jun. 20, 2018, 2 pgs.
(Continued)

*Primary Examiner* — Harry K Liu
(74) *Attorney, Agent, or Firm* — Schwegman Lundberg & Woessner, P.A.

(57) ABSTRACT

A software-defined receiver (SDR) using real long term evolution (LTE) signals may be used for navigation. The LTE SDR leverages the structure of the downlink LTE signal, and provides signal acquisition, navigation-relevant high-level system information extraction, and signal tracking. The LTE SDR also provides the ability to obtain a time-of-arrival (TOA) estimate from received LTE signals, which provides a navigation solution comparable to a GPS-only navigation solution.

20 Claims, 15 Drawing Sheets

(51) Int. Cl.
*G01S 19/48* (2010.01)
*H04W 56/00* (2009.01)
*H04W 64/00* (2009.01)

(52) U.S. Cl.
CPC ........... *G01S 19/48* (2013.01); *H04W 56/006* (2013.01); *H04W 64/006* (2013.01); *B64C 2201/145* (2013.01)

(58) Field of Classification Search
CPC .... G01S 5/0027; B64C 39/02; H04W 56/006; H04W 64/006
USPC .................................................. 342/357.31
See application file for complete search history.

(56) References Cited

U.S. PATENT DOCUMENTS

| | | | |
|---|---|---|---|
| 2014/0266904 A1 | 9/2014 | Sendonaris et al. | |
| 2014/0295881 A1* | 10/2014 | Werner | H04W 4/023 455/456.1 |
| 2015/0253150 A1 | 9/2015 | Guillet et al. | |
| 2015/0350850 A1* | 12/2015 | Edge | G01S 5/0018 455/456.1 |
| 2016/0259060 A1 | 9/2016 | Kurby et al. | |
| 2016/0286009 A1* | 9/2016 | Edge | H04L 67/42 |
| 2017/0034798 A1* | 2/2017 | Lin | H04J 11/0069 |

OTHER PUBLICATIONS

International Application Serial No. PCT/US2017/053002, Written Opinion dated Jun. 20, 2018, 6 pgs.

Shamaei, et al., "Performance Characterization of Positioning in LTE Systems", ION GNSS Conference Portland Oregon, [Online]. Retrieved from the Internet: <https//aspin.ucr.edu/papers/perfomnance_Characterizationof_positioninginLTESystems.pdf>, (Sep. 12-16, 2016), 1,4,5 pgs.

"International Application Serial No. PCT/US2017/053002, International Preliminary Report on Patentability dated Apr. 4, 2019", 8 pgs.

* cited by examiner

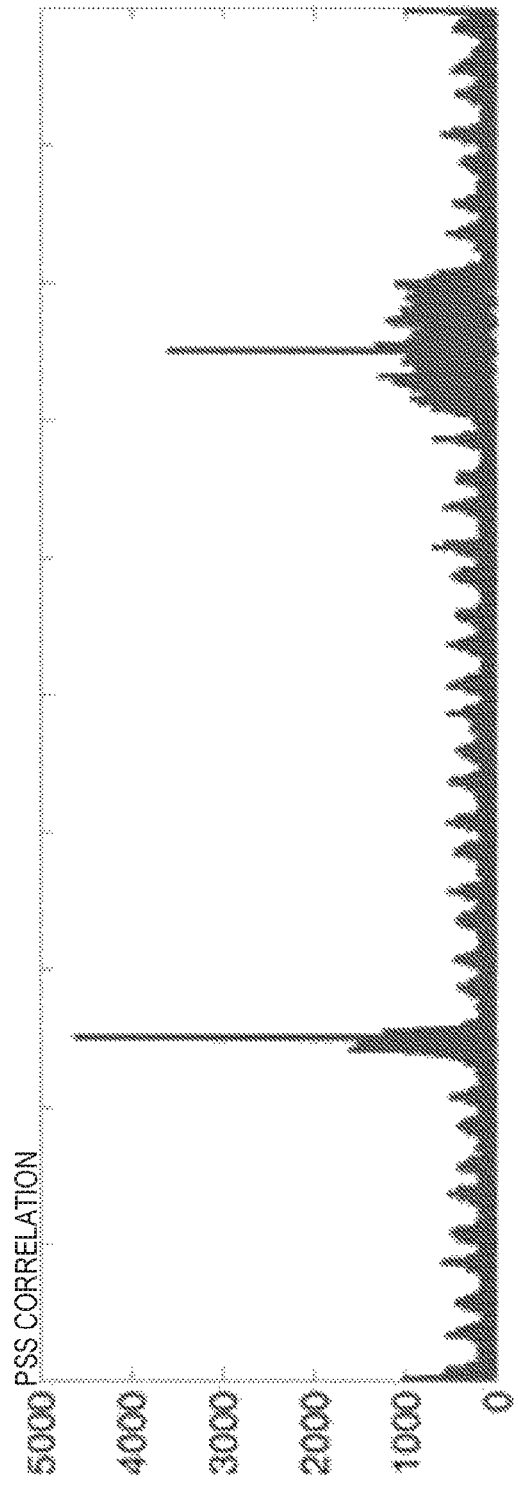
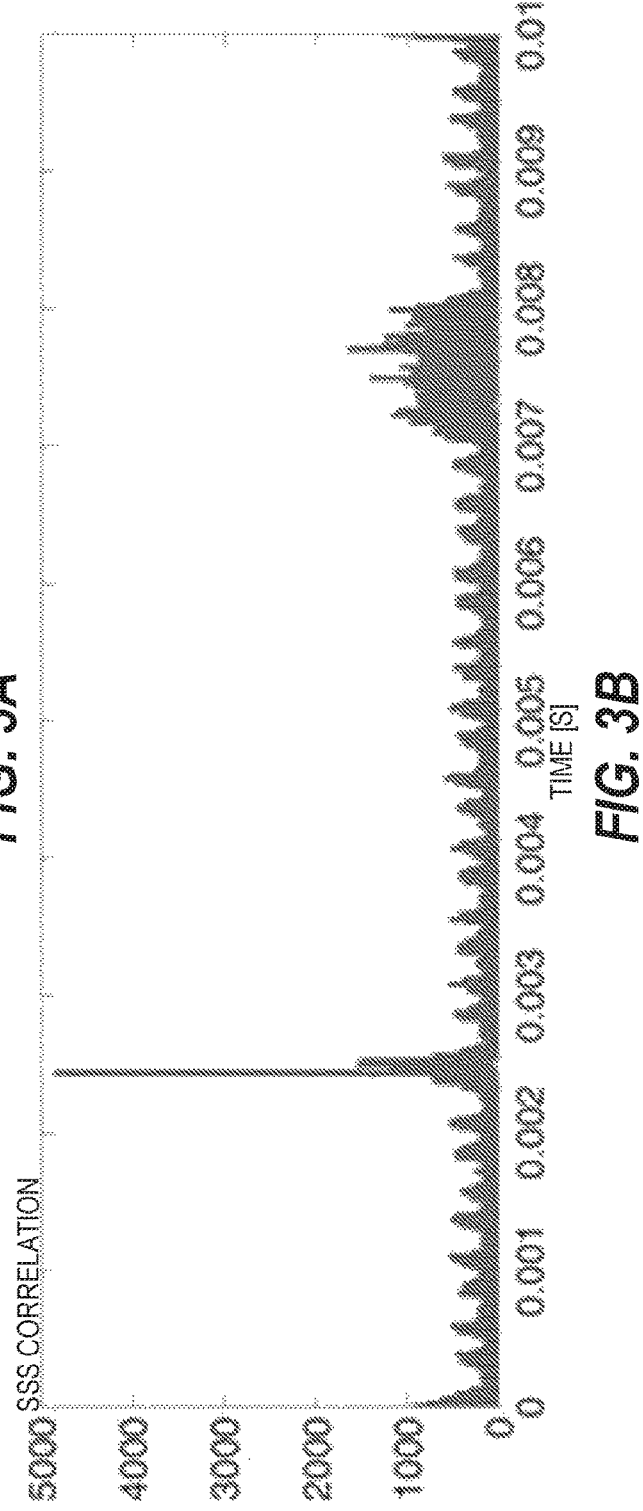
FIG. 3A
FIG. 3B

US 11,187,774 B2

SDR FOR NAVIGATION WITH LTE SIGNALS

RELATED APPLICATION AND PRIORITY CLAIM

This application is a U.S. National Stage Filing under 35 U.S.C. 371 from International Application No. PCT/US2017/053002, filed on Sep. 22, 2017, and published as WO 2018/12533 A2 on Jul. 5, 2018, which is related and claims priority to United States Provisional Application No. 62/398,403, filed on Sep. 22, 2016 and entitled "PERFORMANCE CHARACTERIZATION OF POSITIONING IN LTE SYSTEMS," and is related and claims priority to U.S. Provisional Application No. 62/561,023, filed on Sep. 20, 2017 and entitled "MITIGATING MULTIPATH FOR POSITIONING IN LTE SYSTEMS," the entirety of each of which is are incorporated herein by reference.

STATEMENT OF GOVERNMENT SPONSORED SUPPORT

The subject matter herein was developed with Government support under Grant (or Contract) No. Grant N00014-16-1-2305, awarded by the by the Office of Naval Research. The Government has certain rights to the subject matter herein.

BACKGROUND

Global navigation satellite system (GNSS) navigation may be aided using or replaced with signals of opportunity (SOPs). Using SOPs with or instead of GNSS navigation requires determining observability and estimability of the SOPs landscape for a different number of receivers, a different number of SOPs, and various a priori knowledge scenarios. The SOPs may provide receiver localization and timing. Cellular SOPs may be used to leverage a large number of base transceiver stations in environments where GNSS signals are typically challenged.

BRIEF DESCRIPTION OF THE DRAWINGS

FIGS. 3A-3B are graphs of LTE correlation, in accordance with at least one embodiment.

DESCRIPTION OF EMBODIMENTS

Figure 1:
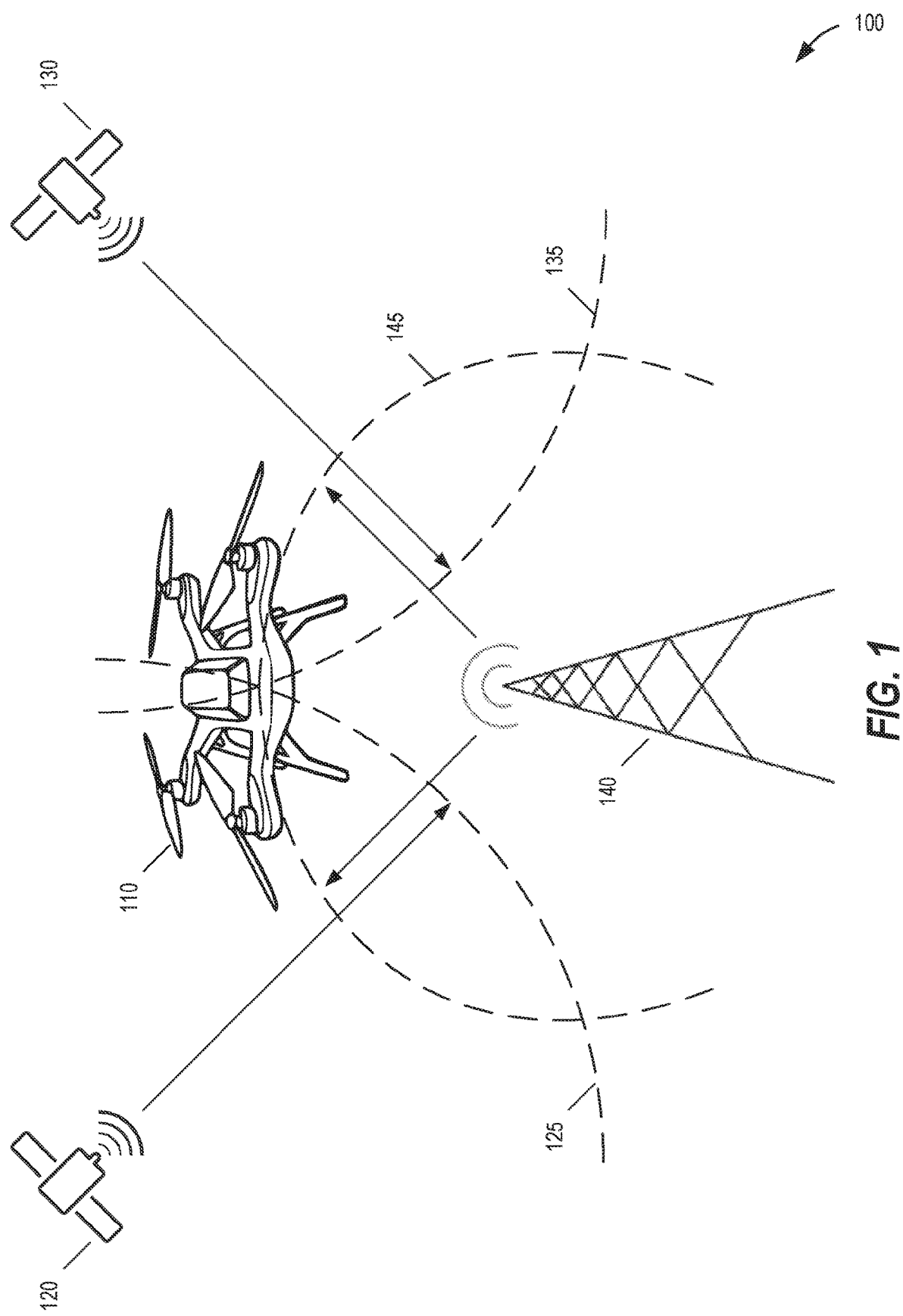
FIG. 1 is a diagram of a signal of opportunity (SOPs) GNSS system 100, in accordance with at least one embodiment.

FIG. 1 is a diagram of a signal of opportunity (SOPs) GNSS system 100, in accordance with at least one embodiment. SOP GNSS system 100 provides various technical solutions to technical problems facing GNSS implementations. System 100 includes a vehicle 110, such as an unmanned aerial vehicle or other mobile vehicle. System 100 includes at least a first GNSS satellite 120 and second GNSS satellite 130, though additional GNSS satellites may be used. Similarly, system 100 includes at least one SOP transceiver 140, though additional SOP transceivers may be used. SOPs may enhance or enable otherwise unavailable navigation, such as whenever GNSS signals become inaccessible or untrustworthy.

Terrestrial SOPs are abundant and are available at varying geometric configurations, and may be used to improve GNSS navigation. The vehicle 110 receives GNSS signals from the first GNSS satellite 120 and calculates a first range 125, where the first range provides an estimated radius for a first range arc 125. Similarly, vehicle 110 calculates a second range arc 135 based on the second GNSS satellite and calculates a third range arc 145 based on the SOP transceiver 140. The SOP transceiver 140 may be used to improve navigation reliability whenever GNSS signals become inaccessible or unreliable.

The SOP transceiver 140 may include a cellular long term evolution (LTE) tower. LTE has become a prominent standard for fourth generation (4G) communication systems. LTE provides multiple-input multiple-output (MIMO) capabilities, which allows higher data rates to be achieved compared to the previous generations of wireless standards. The high bandwidths and data rates employed in LTE systems have made LTE signals attractive for navigation. In LTE Release 9, a broadcast positioning reference signal (PRS) was introduced to enable network-based positioning capabilities within the LTE protocol. However, PRS-based positioning suffers from a number of drawbacks: (1) the user's privacy is compromised since their location is revealed to the network, (2) localization services are limited only to paying subscribers and from a particular cellular provider, (3) ambient LTE signals transmitted by other cellular providers are not exploited, and (4) additional bandwidth is required to accommodate the PRS, which caused the majority of cellular providers to choose not to transmit the PRS in favor of dedicating more bandwidth for traffic channels. To address these drawbacks, user equipment (UE)-based positioning approaches may use the cell-specific reference signal (CRS).

To use signals provided by an LTE tower, vehicle 110 may include a receiver capable of extracting navigation observables from LTE signals. In particular, vehicle 110 may include a LTE-compatible software-defined radio (SDR). There are several challenges associated with navigating with such proposed SDRs, which rely on tracking the primary synchronization signal (PSS) transmitted by the LTE base station, or eNodeB. The first challenge results from the near-far effect created by the strongest PSS, which makes it difficult or impossible for the receiver to individually track the remaining ambient PSSs. Though the SDR could track only the strongest PSSs (up to three), this would give rise to a second challenge: the number of intra-frequency eNodeBs that the receiver can simultaneously use for positioning is limited. Alternatively, other cell-specific signals can be tracked, in which case the receiver must obtain high level information of the surrounding eNodeBs, such as their cell ID, signal bandwidth, and the number of transmit antennas. A third challenge is that LTE information is assumed to be known a priori, however in practice the vehicle 110 SDR must be able to obtain this information in unknown environments.

The systems and methods described herein address the challenges described above. In particular, these systems and methods provide for a navigation cellular LTE SDR architecture with low-level signal models for optimal extraction of relevant navigation and timing information from received signals. In an embodiment, when vehicle 110 enters an unknown LTE environment, the first step it performs to establish communication with the network is synchronizing with at least one surrounding eNodeB (e.g., SOP transceiver 140). This is achieved by acquiring the primary synchronization signal (PSS) and the secondary synchronization signal (SSS) transmitted by the eNodeB. Steps taken by the vehicle 110 to acquire these LTE signals are described below with respect to FIG. 2.

Figure 2:
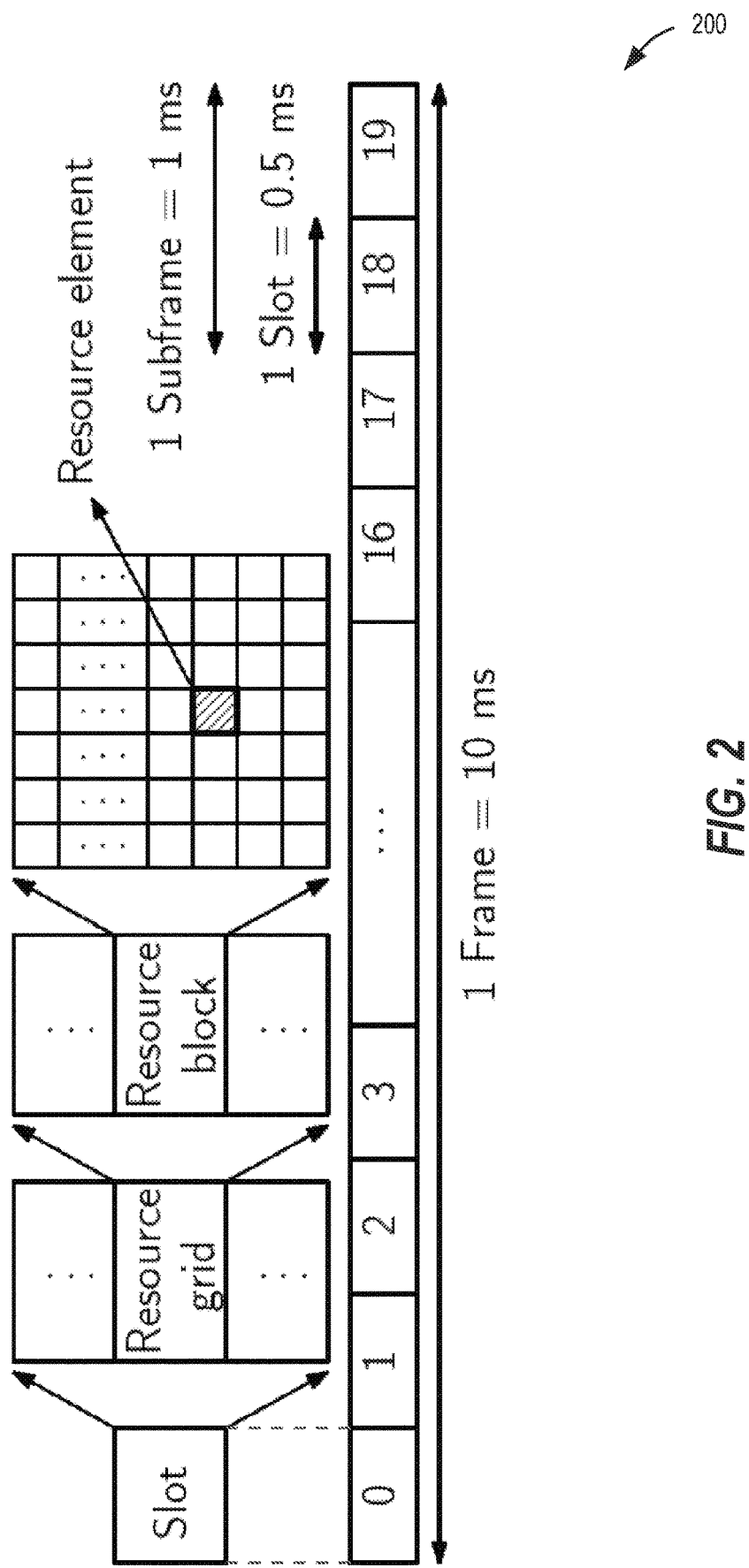
FIG. 2 is a diagram of an LTE Frame Structure, in accordance with at least one embodiment.

FIG. 2 is a diagram of an LTE Frame Structure 200, in accordance with at least one embodiment. An LTE frame, which is a major component in LTE communication, is a two-dimensional grid representing time and frequency. The elementary block of an LTE frame is a complex symbol, defined as a resource element (RE). The frequency index of an RE maps to an LTE subcarrier, and its time index maps to an LTE symbol. The REs are grouped into resource blocks (RBs), which are further grouped into resource grids (RGs). The RGs are then grouped into slots, which constitute a type 1 LTE frame. This type of frame is suitable for frequency division duplex (FDD) transmission. A frame consists of 20 slots of duration 0.5 ms each. Subsequently, an LTE frame will have a duration of 10 ms, and an LTE subframe, which is defined as two consecutive slots, will have a duration of 1 ms.

The subcarriers in an LTE frame are typically separated by $\Delta f=15$ KHz, and the total number of subcarriers, $N_c$, is set by the operator. This implies that different LTE systems may have different bandwidths, which are summarized in Table I. Unused subcarriers create a guardband between LTE bands.

TABLE I

LTE system bandwidths and number of subcarriers.

| Bandwidth (MHz) | Total number of subcarriers | Number of subcarriers used |
|---|---|---|
| 1.4 | 128 | 72 |
| 3 | 256 | 180 |
| 5 | 512 | 300 |
| 10 | 1024 | 600 |
| 15 | 1536 | 900 |
| 20 | 2048 | 1200 |

To transmit a data, data symbols are first mapped onto the frame REs. An inverse fast Fourier transform (IFFT) is applied to each LTE symbol across all the subcarriers. The resulting signal is serialized and appended with a cyclic prefix (CP) before transmission over the wireless channel. This process may be referred to herein as orthogonal frequency division multiplexing (OFDM). The LTE receiver will then reverse these steps in order to reconstruct the LTE frame. However, the LTE receiver must first determine the frame timing, which is achieved by acquiring the PSS and SSS, as it will be discussed below.

FIGS. 3A-3B are graphs of LTE correlation 300, in accordance with at least one embodiment. The PSS may include a length-62 Zadoff-Chu sequence mapped to 62 subcarriers in slot 0 of the LTE frame, and repeated in slot 10. Due to the orthogonality properties of Zadoff-Chu sequences, a peak in the correlation can be seen when the eNodeB's and UE's PSS sequences match, such as shown in FIG. 3A. By detecting these peaks, the UE will be able to determine the LTE symbol timing as well as the integer $N_{ID}^{(2)}$. The DC subcarrier and the remainder of the subcarriers in the symbols where PSS is transmitted are filled with zeros. Each eNodeB's sector transmits one of three possible PSS sequences, each of which maps to an integer between 0 and 2, denoted by $N_{ID}^{(2)}$. The UE correlates the received LTE signal with all three possible PSS sequences that are generated locally.

As shown in FIG. 3B, SSS is detected in a similar way as PSS. SSS is also a length 62 orthogonal sequence, obtained by concatenating two maximal-length sequences scrambled by a third orthogonal sequence generated based on $N_{ID}^{(2)}$. SSS is transmitted only once in the symbol preceding the PSS directly, either in slot 0 or 10. There are 168 possible SSS sequences, each mapped to an integer between 0 and 167, denoted $N_{ID}^{(1)}$. Once the PSS and SSS are detected, the UE can produce an estimate of the frame start time $\hat{t}_s$, as well as determine the cell ID, which is given by $N_{ID}^{cell}=3N_{ID}^{(1)}+N_{ID}^{(2)}$. After obtaining the frame timing, the UE estimates the frequency shift, or Doppler frequency, using the CP in the received signal r(n). The Doppler frequency estimate $\hat{f}_D$ is given by $$\hat{f}_D = \frac{1}{2\pi N_c T_s} \arg\left\{\sum_{n \in N_{CP}} r(n)r^*(n+N_c)\right\},$$

where $(\cdot)^*$ is the complex conjugate operator, $N_{CP}$ is the set of CP indices, and $T_s$ is the sampling interval.

Figure 4:
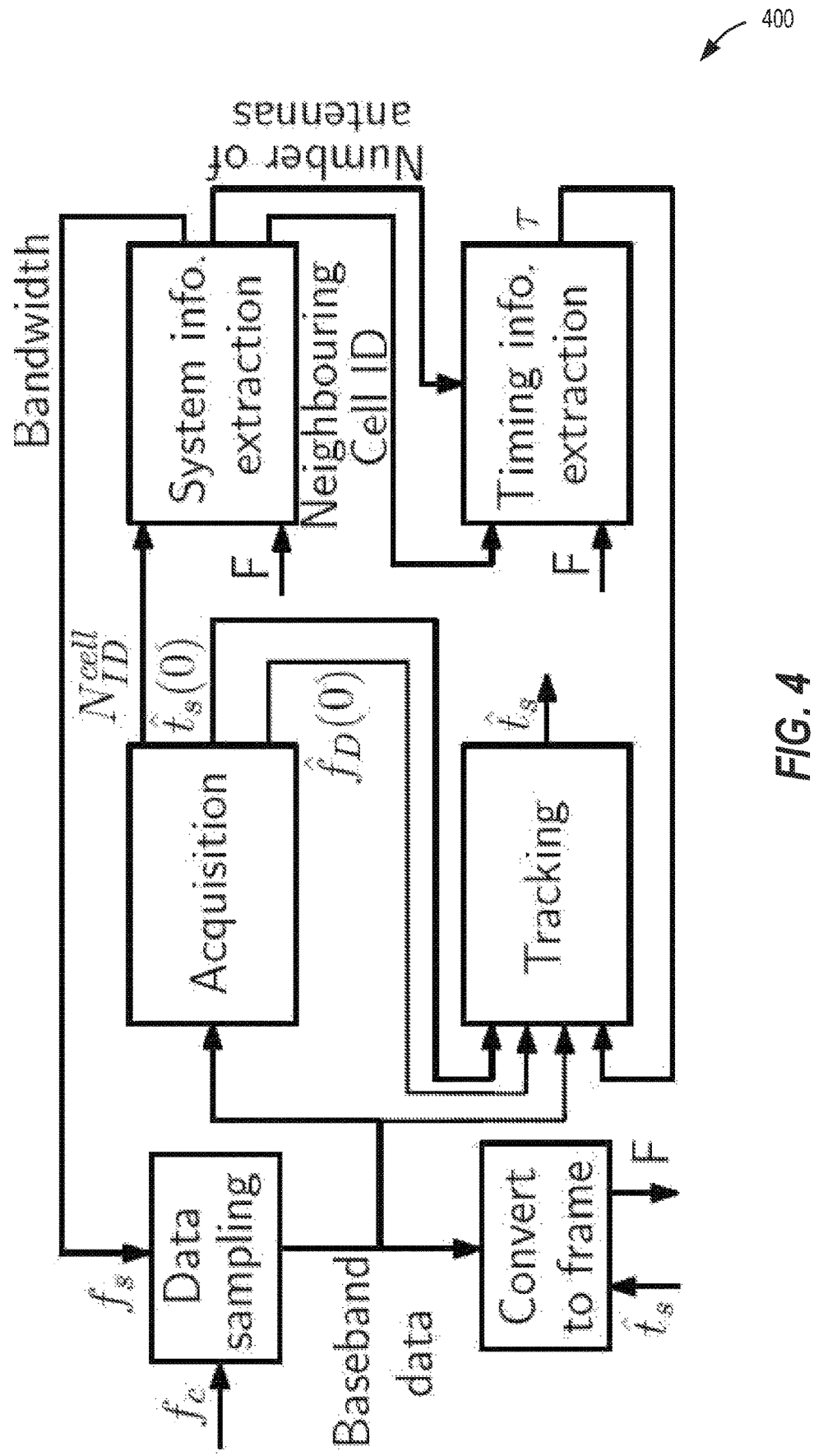
FIG. 4 is a block diagram of an LTE receiver architecture, in accordance with at least one embodiment.

FIG. 4 is a block diagram of an LTE receiver architecture 400, in accordance with at least one embodiment. The LTE receiver architecture 400 shows various functional blocks within the LTE receiver, including the acquisition block to provide detection of the PSS and the SSS described below with respect to FIG. 5.

Figure 5:
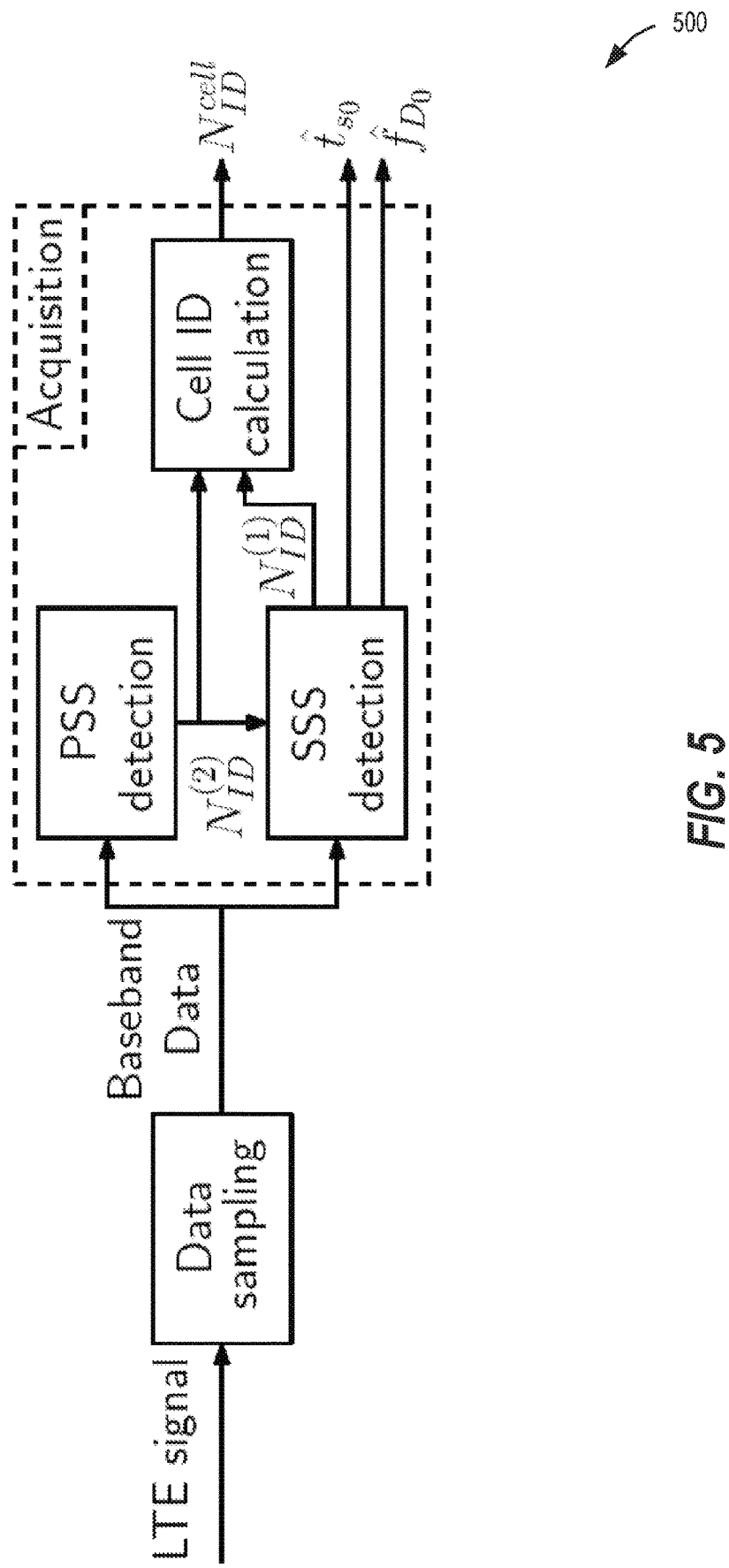
FIG. 5 is a block diagram of an LTE receiver acquisition block, in accordance with at least one embodiment.

FIG. 5 is a block diagram of an LTE receiver acquisition block 500, in accordance with at least one embodiment. The acquisition block 500 receives baseband data and detects the PSS and SSS, which are used to calculate the cell ID. Once the PSS and SSS are acquired, the UE needs to determine several parameters of the LTE network in order to successfully communicate with the eNodeBs, such as determining downlink physical channels described below with respect to FIG. 6.

Figure 6:
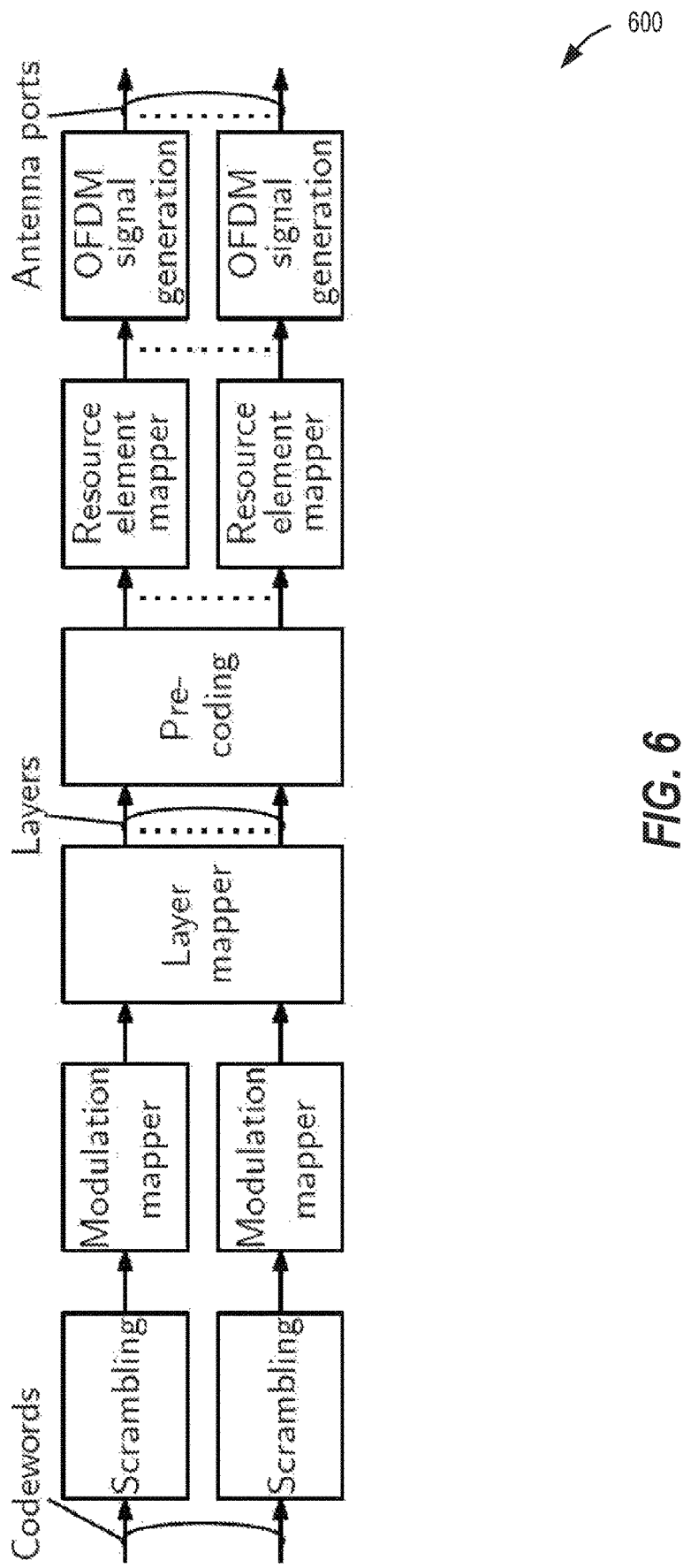
FIG. 6 is a block diagram of a downlink physical channel, in accordance with at least one embodiment.

FIG. 6 is a block diagram of a downlink physical channel 600, in accordance with at least one embodiment. The downlink physical channels may include control, broadcast, or shared channels. The downlink physical channels provide the system parameters in two information blocks: the master information block (MIB) and the system information block (SIB).

A downlink physical channel corresponds to a set of REs carrying high level system information or communication data. There are typically seven physical channels in the LTE downlink. The MIB is transmitted on the physical broadcast channel (PBCH), and the SIB is transmitted on the physical downlink shared channel (PDSCH). The physical control format indicator channel (PCFICH) and the physical downlink control channel (PDCCH) is also decoded to extract the SIB, as explained below.

As shown in FIG. 6, each of the downlink physical channels are processed in a similar fashion before transmission. The codewords are first scrambled and mapped for modulation, which can be either quadrature phase-shift keying (QPSK), 16 quadrature amplitude modulation (QAM), 64QAM, or 256QAM. Layer mapping for spatial and transmit diversity is then performed, and the resulting layers are pre-coded for transmit diversity. Finally, the blocks of symbols are mapped to REs, from which the OFDM signal is generated. Although all the physical channels have the same general structure, each step in FIG. 6 differs from one channel to another.

Because there is no unique bandwidth for LTE systems, it is important for the UE to determine the bandwidth of the system it is trying to connect to. Furthermore, to provide increased transmission rates, LTE systems employ a multiple input multiple output (MIMO) structure where the number of transmit antennas could be either 1, 2, or 4. To decode the LTE signal correctly, the UE must be aware of the actual transmission bandwidth. Information about the number of transmit antennas and the actual transmission bandwidth is provided to the UE in the MIB, which is transmitted in the second slot of the first subframe. The MIB is mapped to the first 6 RBs around the carrier frequency and the first four symbols of the slot. The MIB symbols are not transmitted on the subcarriers reserved for the reference signals, as discussed below.

Figure 7:
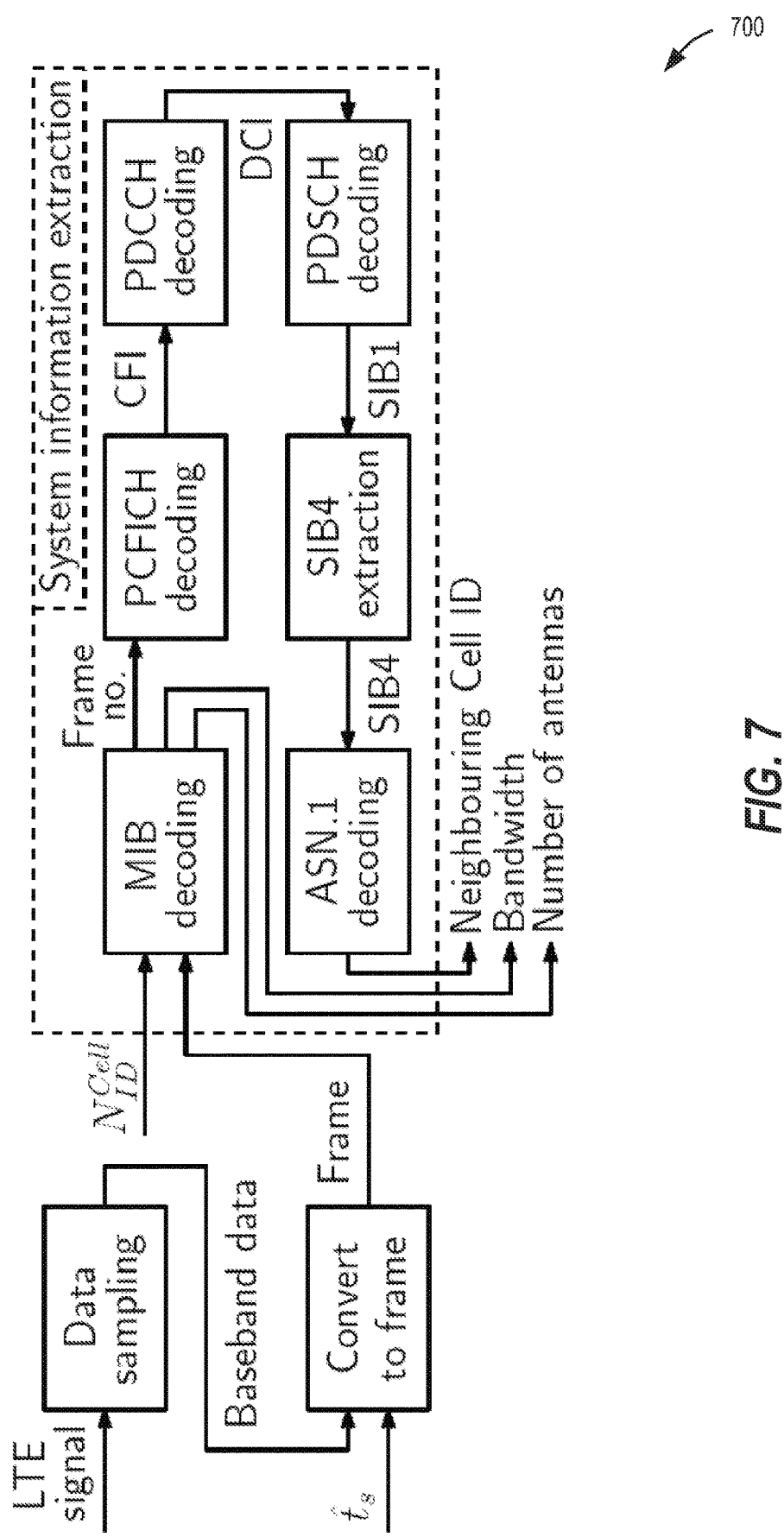
FIG. 7 is a system information extraction block diagram, in accordance with at least one embodiment.

FIG. 7 is a system information extraction block diagram 700, in accordance with at least one embodiment. The system information block (SIB) transmitted by the eNodeB contains information on the cell it is servicing, on interfrequency and intra-frequency neighboring cells, on neighboring cells from other networks (UMTS, GSM, and CDMA2000), and other warning and alert system information. The transmitted SIB can be in the form of one out of seventeen blocks, numbered SIB1 to SIB17. SIB1 is transmitted in subframe 5 of every even frame, and it contains scheduling information for the other SIBs, which can be subsequently decoded. Decoding the SIB involves several steps, which are summarized and listed herein in the order in which the UE executes the steps, as shown in FIG. 7. To decode the SIB, the UE first decodes the control format information (CFI) from the PCFICH. The UE then decodes the downlink control information (DCI) from the PDCCH, which will allow it to extract the SIB bits from the PDSCH. Finally, an Abstract Syntax Notation One (ASN.1) decoder is used to recover the system information sent by the eNodeB.

The CFI is transmitted on the PCFICH. It indicates the number of OFDM symbols dedicated for the downlink control channel, and can take the values 1, 2, or 3. In order to decode the CFI, the UE first locates the 16 PCFICH REs and demodulates them by reversing the steps in FIG. 6, resulting in a sequence of 32 bits. This sequence can be only one of three possible sequences, each of which is mapped to a CFI value.

Knowing the CFI, the UE can identify the REs associated with the PDCCH and demodulate them, resulting in a block of bits corresponding to the DCI message. The packing of these bits can take one of several formats, and is not communicated with the UE. A blind search over the different formats is performed by the UE to unpack these bits. The "candidate" formats are either on the common search space, or on the UE-specific search space, though there are two candidate formats and are both located on the common search space. A cyclic redundancy check (CRC) is obtained to identify the right format.

The DCI is next parsed to give the configuration of the corresponding PDSCH REs carrying the SIB, which are then demodulated. Next, the received bits in downlink-shared channel (DL-SCH) are decoded, resulting in the SIB bits. Subsequently, these bits are decoded using an ASN.1 decoder, which will extract the system information sent on the SIB by the eNodeB.

During signal acquisition, the frame timing and the eNodeB cell ID are determined. Then, the MIB is decoded and the bandwidth of the system as well as the frame number are extracted. This will allow the UE to demodulate the OFDM signal across the entire bandwidth and locate the SIB1 REs. The UE moves on to decode the SIB1 message, from which the scheduling for SIB4 is deduced and, subsequently, decoded. SIB4 contains the cell ID of intra-frequency neighboring cells as well as other information pertaining to these cells. Decoding this information gives the UE the ability to simultaneously track signals from different eNodeBs and produce time-of-arrival (ToA) estimates from each of these eNodeBs. Signal tracking and ToA estimation is described below.

Figure 8:
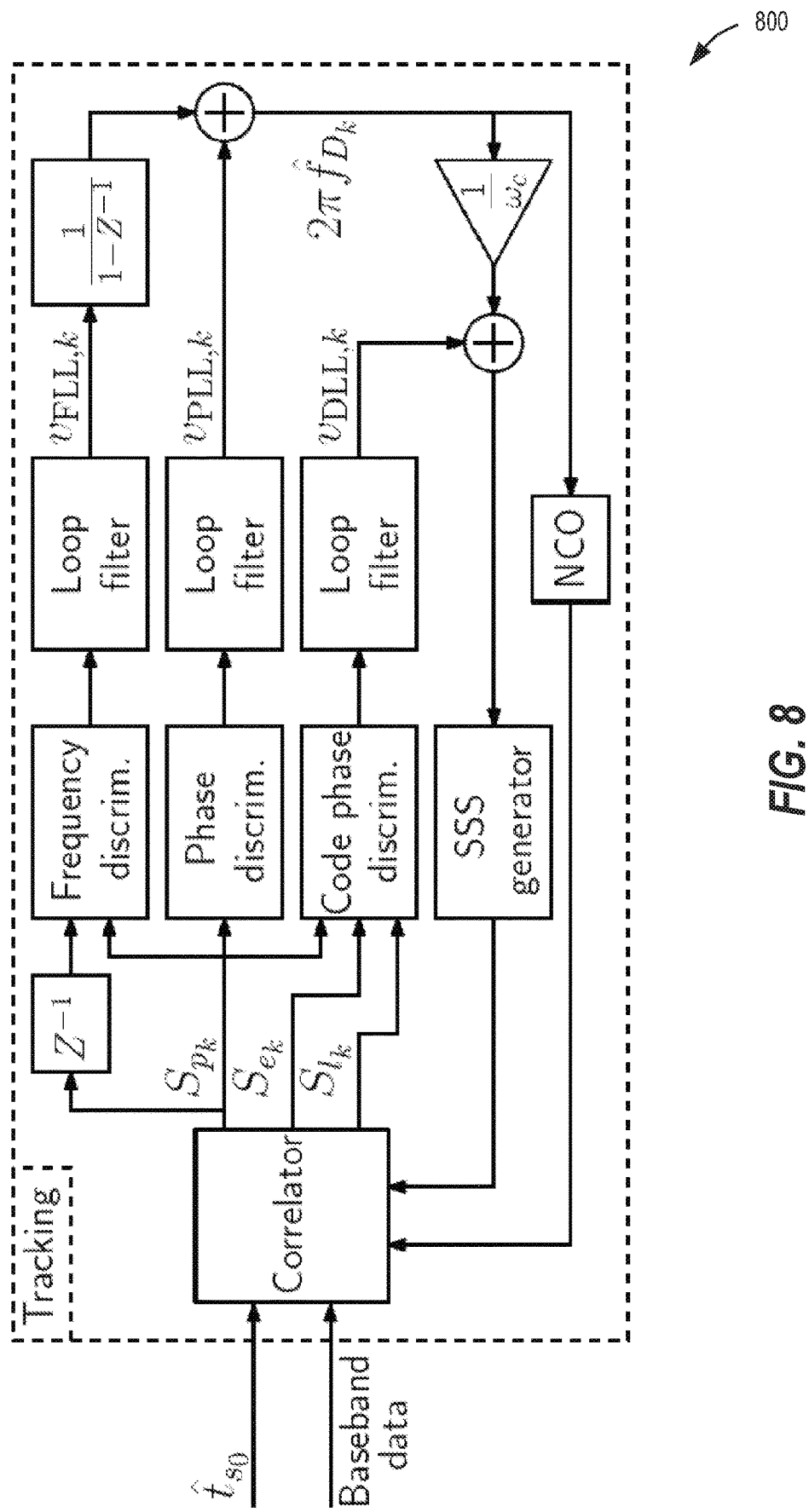
FIG. 8 is a signal tracking block diagram, in accordance with at least one embodiment.

FIG. 8 is a signal tracking block diagram 800, in accordance with at least one embodiment. The signal tracking block diagram 800 may provide tracking of the PSS or SSS, which enables the UE to stay synchronized with the eNodeB and continuously reconstruct the LTE frame. Because there are 3 possible PSS sequences, there will be high level of interference from neighboring cells. The interference level is much lower for the SSS, which can be one of 168 possible sequences. The signal tracking block diagram 800 therefore tracks the SSS instead of the PSS. The components of the signal tracking block diagram 800 tracking loop used to track the SSS may include the frequency-locked loop assisted (FLL-assisted) phase-locked loop (PLL) and the carrier-aided delay-locked loop (DLL).

The signal tracking block diagram 800 includes a FLL-assisted PLL, which includes a phase discriminator, a phase loop filter, a frequency discriminator, a frequency loop filter, and a numerically-controlled oscillator (NCO). Because no data is modulated on the SSS, an a tan 2 phase discriminator, which remains linear over the full input error range of ±π, could be used without the risk of introducing phase ambiguities. A third-order PLL may be used to track the carrier phase, with a loop filter transfer function given by $$F_{PLL}(s) = 2.4\omega_{n,p} + \frac{1.1\omega_{n,p}^2}{s} + \frac{\omega_{n,p}^3}{s^2}, \tag{1}$$

where $\omega_{n,p}$ is the undamped natural frequency of the phase loop, which can be related to the PLL noise-equivalent bandwidth $B_{n,PLL}$ by $B_{n,PLL}=0.7845\omega_{n,p}$. The output of the phase loop filter is the rate of change of the carrier phase error $2\pi f_{Dk}$, expressed in rad/s, where $f_{Dk}$ is the Doppler frequency. The phase loop filter transfer function in (1) is discretized and realized in state-space. The noise-equivalent bandwidth $B_{n,PLL}$ is chosen to range between 4 and 8 Hz. The PLL is assisted by a second-order FLL with an a tan 2 discriminator for the frequency. The frequency error at time step k is expressed as $$e_{f_k} = \frac{a\tan2(Q_{pk}I_{pk-1} - I_{pk}Q_{pk-1}, I_{pk}I_{pk-1} + Q_{pk}Q_{pk-1})}{T_{sub}},$$

where $S_{pk}=I_{Pk}+jQ_{pk}$ is the prompt correlation at time step k, and $T_{sub}=0.01$ s is the sub-accumulation period, which is chosen to be one frame length. The transfer function of the frequency loop filter is given by $$F_{FLL}(s) = 1.414\omega_{n,f} + \frac{\omega_{n,f}^2}{s}, \quad (2)$$

where $\omega_{n,f}$ is the undamped natural frequency of the frequency loop, which can be related to the FLL noise-equivalent bandwidth $B_{n,FLL}$ by $B_{n,FLL}=0.53\omega_{n,f}$. The output of the frequency loop filter is the rate of change of the angular frequency $2\pi \hat{f}^*_{Dk}$, expressed in rad/s². It is therefore integrated and added to the output of the phase loop filter. The frequency loop filter transfer function in (2) is discretized and realized in state-space. The noise-equivalent bandwidth $B_{n,FLL}$ is chosen to range between 1 and 4 Hz.

The signal tracking block diagram 800 also includes a carrier-aided DLL, which may use a non-coherent dot product discriminator. To compute the SSS code phase error, the dot product discriminator uses the prompt, early and late correlations, denoted by $S_{pk}$, $S_{ek}$, and $S_{lk}$, respectively. The early and late correlations are calculated by correlating the received signal with an early and a delayed version of the prompt SSS sequence, respectively. The time shift between $S_{ek}$ and $S_{lk}$ is defined by an early-minus-late time $t_{eml}$, expressed in chips. The chip interval $T_c$ for SSS (and PSS), can be expressed as $$T_c = \frac{1}{BW},$$

where BW is the bandwidth of the synchronization signal. Since the SSS and PSS occupy only 62 subcarriers, BW is calculated to be BW=62×15=930 KHz, which gives $T_c \approx 1.0752$ μs. The autocorrelation function of the transmitted LTE SSS is wide at its peak and therefore a wider $t_{eml}$ is preferable in order to have a significant difference between $S_{pk}$, $S_{ek}$, and $S_{lk}$.

The DLL loop filter may include a simple gain K, with a noise-equivalent bandwidth $$B_{n,DLL} = \frac{K}{4} \equiv 0.5 \text{ Hz}.$$

The output of the DLL loop filter $v_{DLL}$ is the rate of change of the SSS code phase, expressed in s/s. Assuming low-side mixing, the code start time is updated according to $$\hat{t}_{s_{k+1}} = \hat{t}_{s_k} - \left(v_{DLL,k} + \frac{\hat{f}_{D_k}}{f_c}\right) \cdot T_{sub}$$

Finally, the SSS code start time estimate is used to reconstruct the transmitted LTE frame.

Figure 9A:
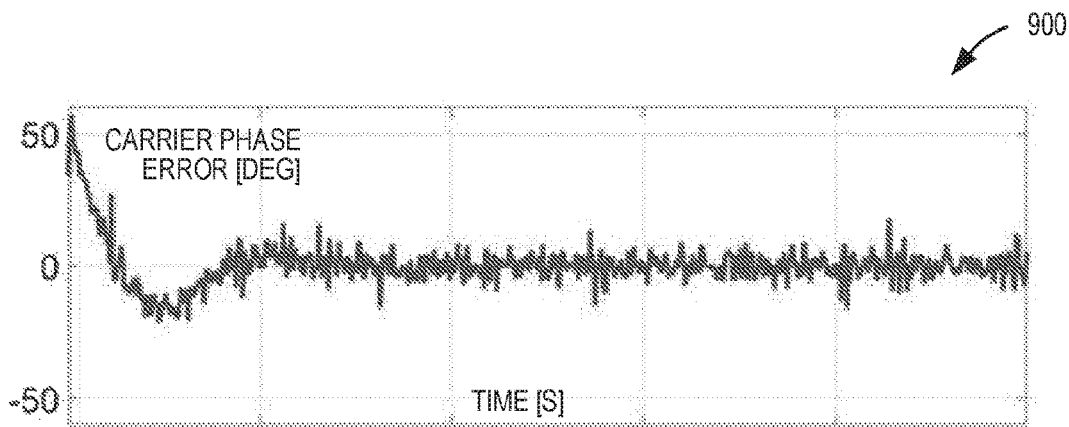
FIGS. 9A-9D are graphs of tracking performance, in accordance with at least one embodiment.
Figure 9B:
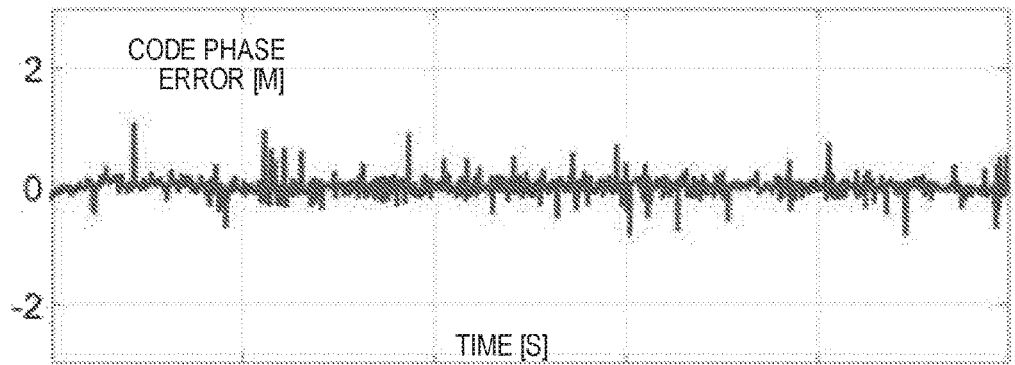
Figure 9C:
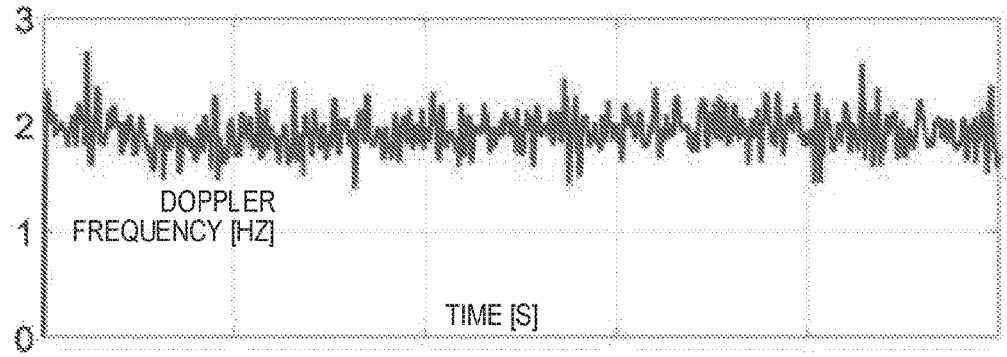
Figure 9D:
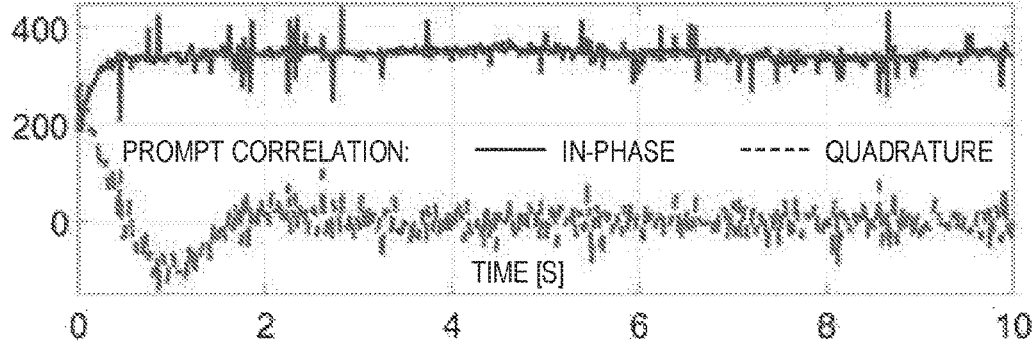

FIGS. 9A-9D are graphs of tracking performance 900, in accordance with at least one embodiment. The tracking performance 900 show the performance of various components of the signal tracking block diagram 800. FIG. 9A shows the carrier phase error, and FIG. 9B shows the code phase error. FIG. 9C shows the doppler frequency, and FIG. 9D shows the in-phase and quadrature-phase correlation.

Figure 10:
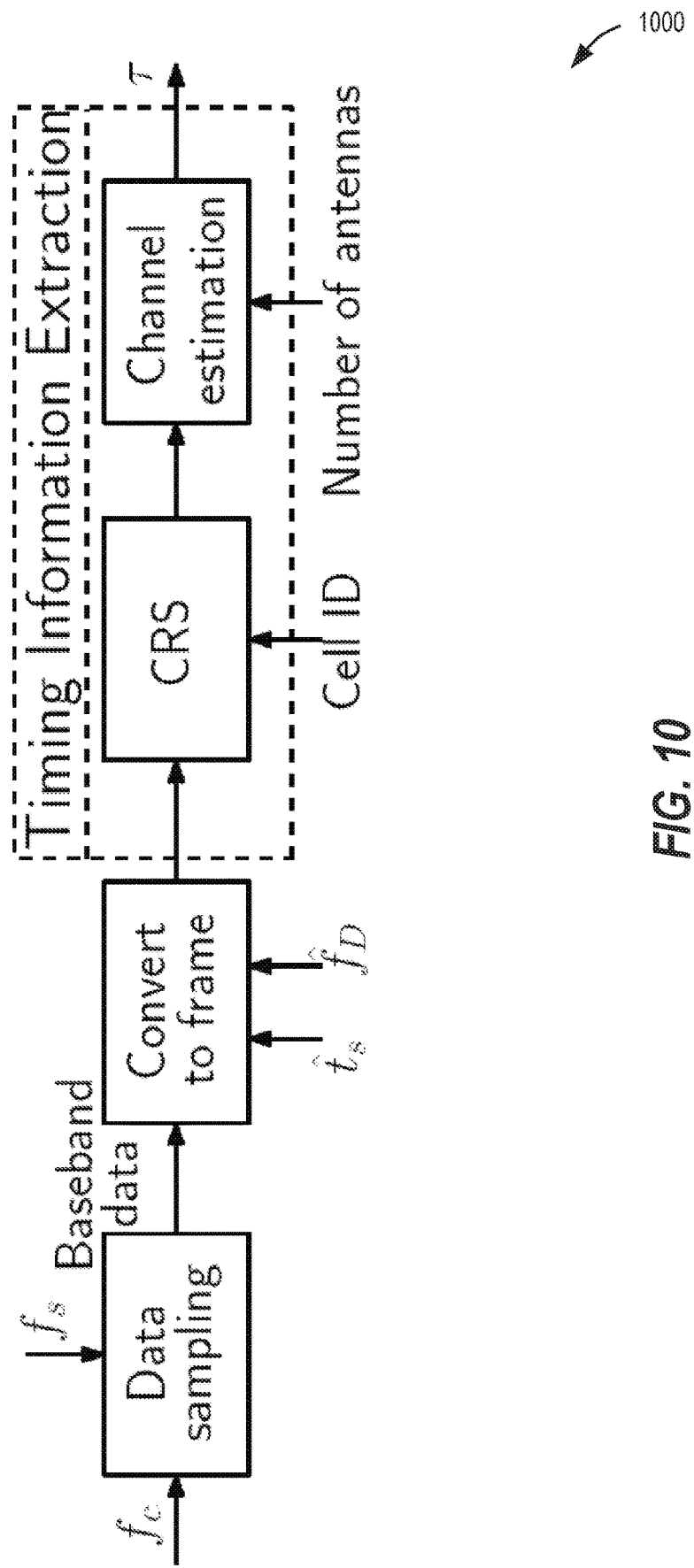
FIG. 10 is a timing information extraction block diagram, in accordance with at least one embodiment.

FIG. 10 is a timing information extraction block diagram 1000, in accordance with at least one embodiment. In LTE systems, the PSS and SSS are transmitted with the lowest possible bandwidth. Consequently, the timing resolution obtained from these signals is low. For more precise navigation using LTE signals, the cell-specific reference signal (CRS) is used. The timing information extraction block diagram 1000 includes the CRS, which provides the ability to determine timing information. The CRS is a pseudorandom sequence which is uniquely defined by the eNodeB's cell ID. The CRS is spread across the entire bandwidth and is transmitted mainly to estimate the channel frequency response. The CRS subcarrier allocation depends on the cell ID, and it is designed to keep the interference with CRSs from other eNodeBs to a minimum. The transmitted OFDM signal from the u-th eNodeB at the k-th subcarrier, $Y^{(u)}(k)$, can be expressed as $$Y^{(u)}(k) = \begin{cases} S^{(u)}(k) & \text{if } k \in A^{(u)}, \\ D^{(u)}(k) & \text{others}, \end{cases}$$

where $S^{(u)}(k)$ is the u-th eNodeB's CRS sequence, $A^{(u)}$ is the set of subcarriers in which $S^{(u)}(k)$ is transmitted, and $D^{(u)}(k)$ represents some other data signals. Assuming that the transmitted signal propagates in an additive white Gaussian noise (AWGN) channel, the received signal will be $$R(k) = \sum_{u=0}^{U-1}(H^{(u)}(k)Y^{(u)}(k) + w^{(u)}(k)),$$

where $H^{(u)}(k)$ is the channel frequency response at the k-th subcarrier and $w^{(u)}(k)$ is an AWGN.

The timing information extraction block diagram 1000 includes an estimation of the channel impulse response. The channel frequency response estimate of the desired eNodeB, u', is obtained according to $$\hat{H}^{(u')}(k) = S^{(u')^*}(k)R(k) \quad (3)$$
$$= H^{(u')}(k)|S^{(u')}(k)|^2 + I^{(u')}(k) + V(k),$$

where $$k \in A^{(u')}, I^{(u')} = S^{(u')^*}(k)\sum_{\substack{u=0 \\ u \neq u'}}^{U-1} H^{(u)}(k)D^{(u)}(k),$$

and $$V(k) = S^{(u')^*}(k)\sum_{u=0}^{U-1} w^{(u)}(k)$$

From the properties of the CRS sequence,
$$|S^{(u')}(k)|^2=1,$$

hence $$\hat{H}^{(u')}(k)=H^{(u')}(k)+I^{(u')}(k)+V(k).$$

The data transmitted by each eNodeB is scrambled by a pseudo-random sequence that is orthogonal to the sequences of other eNodeBs, which means that $I^{(u')}$ must be zero. However, since the DC component of the transmitted data is removed, the orthogonality between different pseudo-random codes is lost, and the resulting correlation can be modeled as a zero-mean Gaussian random variable. Letting $$\Gamma(k) \triangleq I^{(u')}(k) + V(k),$$

then $$\hat{H}^{(u')}(k) = H^{(u')}(k) + \Gamma(k),$$

where $\Gamma(k)$ is a zero-mean Gaussian random variable as well. The channel impulse response estimate is given by $$\hat{h}^{(u')}(n) = \mathrm{IFFT}\{\hat{H}^{(u')}(k)\} = h^{(u')}(n) + \gamma(n) \qquad (4).$$

In general, a multipath channel can be modeled as $$h^{(u)}(n) = \sum_{l=0}^{L^{(u)}-1} \alpha^{(u)}(l)\delta(n - n^{(u)}(l)),$$

where $\alpha^{(u)}(l)$ and $n^{(u)}(l)$ are the attenuation and the delay of the l-th path to the u-th eNodeB, respectively. Estimating $n^{(u')}(l)$ is achieved through the following hypothesis test $$H_0: \hat{h}^{(u')}(n) = \gamma$$

for $n \neq n^{(u')}(l)$, $l=0, \ldots, L-1$, $$H_1: \hat{h}^{(u')}(n) = \alpha^{(u')}(l) + \gamma$$

for $n = n^{(u')}(l)$, $l=0, \ldots, L-1$, where it can be shown that $|\hat{h}^{(u')}(n)|$ has a Rayleigh distribution under $H_0$, and a Rician distribution under $H_1$. To increase the probability of detection, the channel impulse response estimates at different slots can be added incoherently. Similarly, the channel impulse response estimates for different transmit antennas can also be added incoherently, assuming that they have the same line-of-sight (LOS) path. In this paper, the channel frequency response estimates are accumulated across the entire frame to improve the detection performance.

The LTE signals cam be used to extract pseudorange measurements. The receiver state is defined by $x_r = [r_r^T, c\delta t_r]^T$, where $r_r = [x_r, y_r, z_r]^T$ is the receiver's position vector, $\delta t_r$ is the receiver's clock bias, and c is the speed-of-light. Similarly, the state of the i-th eNodeB is defined as $x_{s_i} = [r_{s_i}^T, c\delta t_{s_i}]^T$, where $r_{s_i} = [x_{s_i}, y_{s_i}, z_{s_i}]^T$ is the eNodeB's position vector and $\delta t_{s_i}$ is its clock bias. Subsequently, the pseudorange measurement to the i-th eNodeB at time t, $\rho_i$, can be expressed as $$\rho_i = \|r_r - r_{s_i}\|_2 + c \cdot [\delta t_r - \delta t_{s_i}] + v_i,$$

where $v_i$ is the measurement noise, which is modeled a zero-mean Gaussian random variable with variance $\sigma_i^2$. By drawing pseudorange measurements to four or more eNodeBs, the UE can estimate its state, provided that the position and the clock bias of the eNodeBs are known. The SOP position can be mapped with a high degree of accuracy collaboratively or non-collaboratively. Additionally, the location of LTE base stations can be obtained from online databases, ground surveys, satellite imagery, or other sources, which may provide a reliable estimate of the position of the eNodeBs to the UE. However, the clock bias of these base stations is a stochastic dynamic process, and needs to be continually estimated. In an embodiment, only the difference $\delta t_i$, $\delta t_r - \delta t_{s_i}$ is considered, though additional embodiments may consider the receiver and eNodeB's individual clock biases. This difference is modeled as a first order polynomial, i.e., $\delta t_i(t) = a_i t + b_i$, where at is the clock drift between the receiver and the i-th eNodeB and $b_i$ is the corresponding constant bias. The coefficients of t are calculated from the GPS data and the measured pseudoranges using a least-squares (LS) fit. The pseudorange at time t is re-expressed as $\rho_i \approx h_i(r_r, r_{si}) + v_i$, where $h_i(r_r, r_{s_i}) \triangleq \|r_r - r_{s_i}\|_2 + c \cdot [a_i t + b_i]$. By making pseudorange measurements to $N \geq 3$ eNodeBs with known position states, the receiver can estimate its position state using an iterative weighted nonlinear LS (WNLS) solver. The receiver's position estimate update at the l-th iteration is given by $$\hat{r}_r^{(l+1)} = \hat{r}_r^{(l)} + (H^T R^{-1} H)^{-1} H^T R^{-1} (\rho - \hat{h}^{(l)})$$

where $$\hat{h}^{(l)} = [h_1(\hat{r}_r^{(l)}, r_{s_1}), \ldots, h_N(\hat{r}_r^{(l)}, r_{s_N})]^T$$

$$\rho = [\rho_1, \ldots, \rho_N]^T$$

$$R = \mathrm{diag}(\sigma_1^2, \ldots, \sigma_N^2)$$

is the measurement noise covariance matrix, and H is the Jacobian matrix with respect to the receiver's position, given by $$H \triangleq \left[ \frac{\hat{r}_r^{(l)} - r_{s_1}}{\|\hat{r}_r^{(l)} - r_{s_1}\|_2} \quad \cdots \quad \frac{\hat{r}_r^{(l)} - r_{s_N}}{\|\hat{r}_r^{(l)} - r_{s_N}\|_2} \right]^T.$$

The timing information extraction block diagram 1000 may provide improved performance in the presence of multipath signals. As described above, the LTE receiver may be used to track the SSS, however the transmission bandwidth of the SSS is less than 1 MHz, leading to low TOA accuracy in a multipath environment. However, the SSS can provide computationally low-cost and relatively precise pseudorange information using conventional delay-locked-loops (DLLs). A cell-specific reference signal (CRS) receiver may be used to track a channel impulse response (CIR), which may be used to improve the result of the SSS tracking. The CRS is a reference sequence, which may be used to estimate a channel between an eNodeB and the UE. The CRS may provide increased accuracy in estimating the TOA due to its higher transmission bandwidth. The CIR tracking may be improved further by applying an adaptive threshold for the CRS receiver, such as described below.

An adaptive threshold may be determined through the use of constant false alarm rate (CFAR). An initial threshold may be dependent on the noise variance, $\sigma_h^2$, however the noise variance continuously changes in a dynamic environment, and the threshold must be updated accordingly. Changing the threshold to keep a constant $p_{FA}$ is defined as constant false alarm rate (CFAR). Cell-averaging CFAR (CACFAR) is an example CFAR technique. In CA-CFAR, each cell is tested for the presence of a signal. For a given cell under test (CUT), a functional of $N_e$ training cells separated from the CUT by $N_g$ guard cells is computed. In a square-law detector, this functional will be the sum of $|\hat{h}^{(u')}(n)|^2$, which is proportional to the background noise level given by $$P_n = \sum_{m=1}^{N_1} x_m,$$

where $x_m$ is the functional evaluated at the m-th training cell. A threshold can be obtained by multiplying $P_n$ by a constant K, hence $\eta = KP_n$, which can be shown to have a noncentral chi-square distribution with $2N_t$ degrees of freedom. The probability of false alarm for a specified threshold is $$p_{FA} = e^{-\frac{\eta_T^2}{\sigma_h^2}}$$

The $p_{FA}$ in CA-CFAR can be obtained by taking the average of above over all possible values of the decision threshold. This yields $$\eta = (p_{FA}^{-1/N_t} - 1) P_n,$$

which is used to compare the desired cell's value to the noise floor.

To improve the probability of detection while maintaining a constant $p_{FA}$, a non-coherent integration can be used. For this purpose, it is proposed to integrate squared envelopes of $\hat{h}^{(u)}(n)$ at different slots and for different transmitting antennas (assuming that they have the same LOS path) in one frame duration. Defining $n_i$ as the number of non-coherent integrations, averaging is performed over $n_i N_t$ training cells. Therefore, after integration, the threshold will have a non-central chi-square distribution with $2n_i N_t$ degrees of freedom. By taking the average of the probability of false alarm given the threshold over the new pdf of this threshold, it can be shown that $$p_{FA} = \frac{1}{(1+K)^{n_i N_t}} \sum_{k=0}^{n_i-1} \frac{1}{k!} \frac{\Gamma(n_i N_t + k)}{\Gamma(n_i N_t)} \left( \frac{K}{K+1} \right)^k,$$

where K can be solved for numerically, and the threshold will be determined from $\eta = KP_n$.

Using the proposed method for tracking the TOA, the probability of false alarm in detecting the first peak means that noise is erroneously detected as a valid signal, which can cause significant errors and potentially loss of track. To resolve this problem, a low-pass filter is applied after the CFAR detector, which removes sudden changes in the estimated TOA. The localization error with the proposed method is acceptable for medium to high bandwidth LTE signals (e.g. above 10 MHz). For lower bandwidths, other methods could be exploited. After detecting $d^{(u)}(0)$, the residual TOA, $\tau = T_s d^{(u)}(0)$, is fed-back to the tracking loops to improve the estimated frame start time $\hat{t}_s$.

Figure 11:
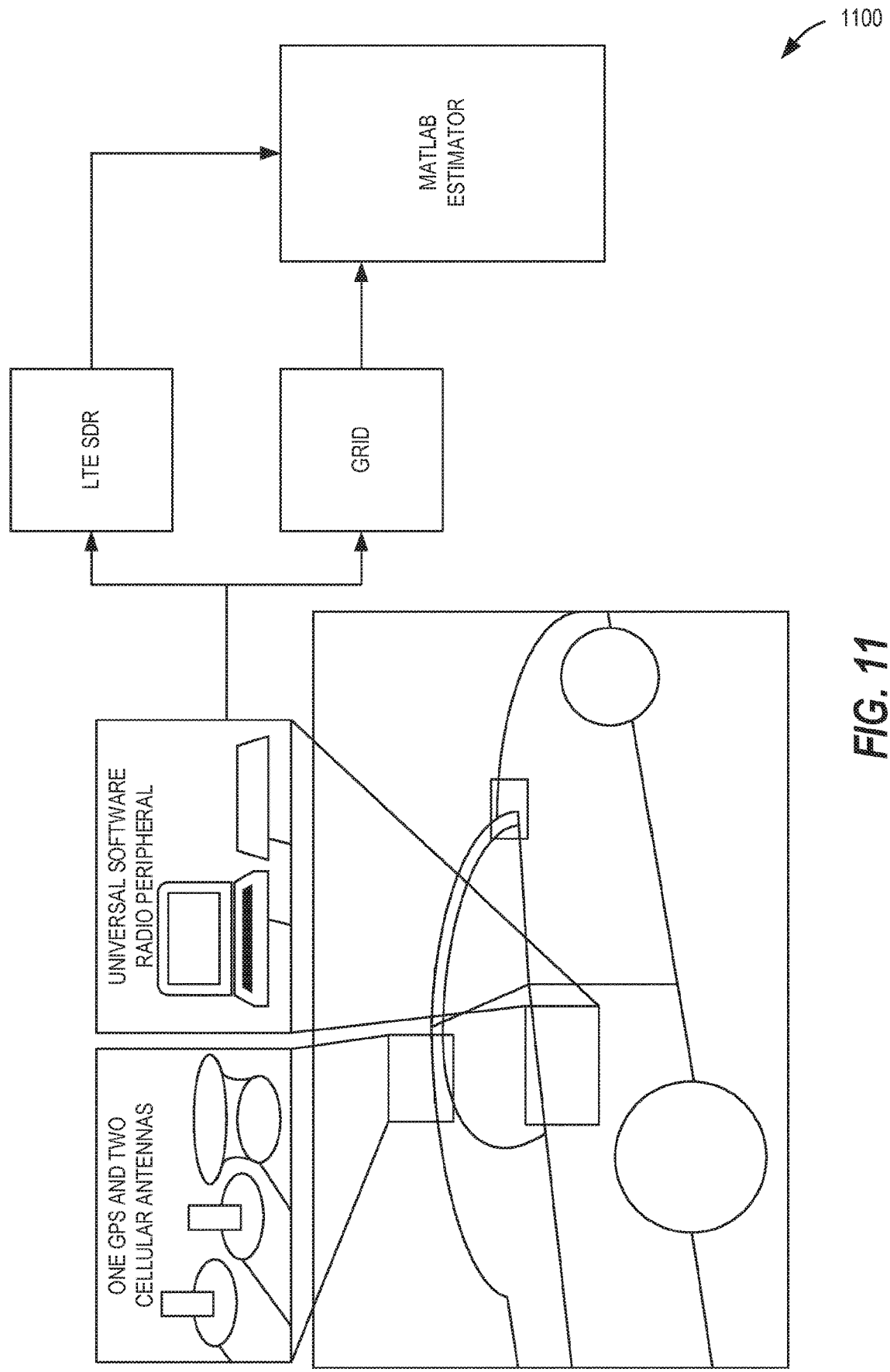
FIG. 11 is a block diagram of an experimental configuration, in accordance with at least one embodiment.

FIG. 11 is a block diagram of an experimental configuration 1000, in accordance with at least one embodiment. The experimental configuration 1000 may be used to evaluate the performance of the proposed LTE SDR, such as by conducting a field test real LTE signals in a semi-urban environment. The experimental configuration 1000 includes a mobile ground receiver equipped with three antennas to acquire and track one set of GPS signals and two different bands of LTE signals from nearby eNodeBs. The experimental configuration 1000 includes LTE receiver antennas, such as consumer-grade 800/1900 MHz cellular omnidirectional antennas, and the GPS antenna includes a surveyor-grade Leica antenna. The LTE signals may be simultaneously down-mixed and synchronously sampled via a dual-channel universal software radio peripheral (USRP) driven by a GPS-disciplined oscillator. The GPS signals may be collected on a separate single-channel USRP also driven by a GPS-disciplined oscillator. The LTE receiver may be tuned to 739 and 1955 MHz carrier frequencies, both of which are allocated for AT&T. Samples of the received signals may be stored for off-line post-processing. The GPS signal may be processed by a Generalized Radio-navigation Interfusion Device (GRID) SDR and the LTE signals may be processed by the proposed MATLAB-based LTE SDR.

Figure 12:
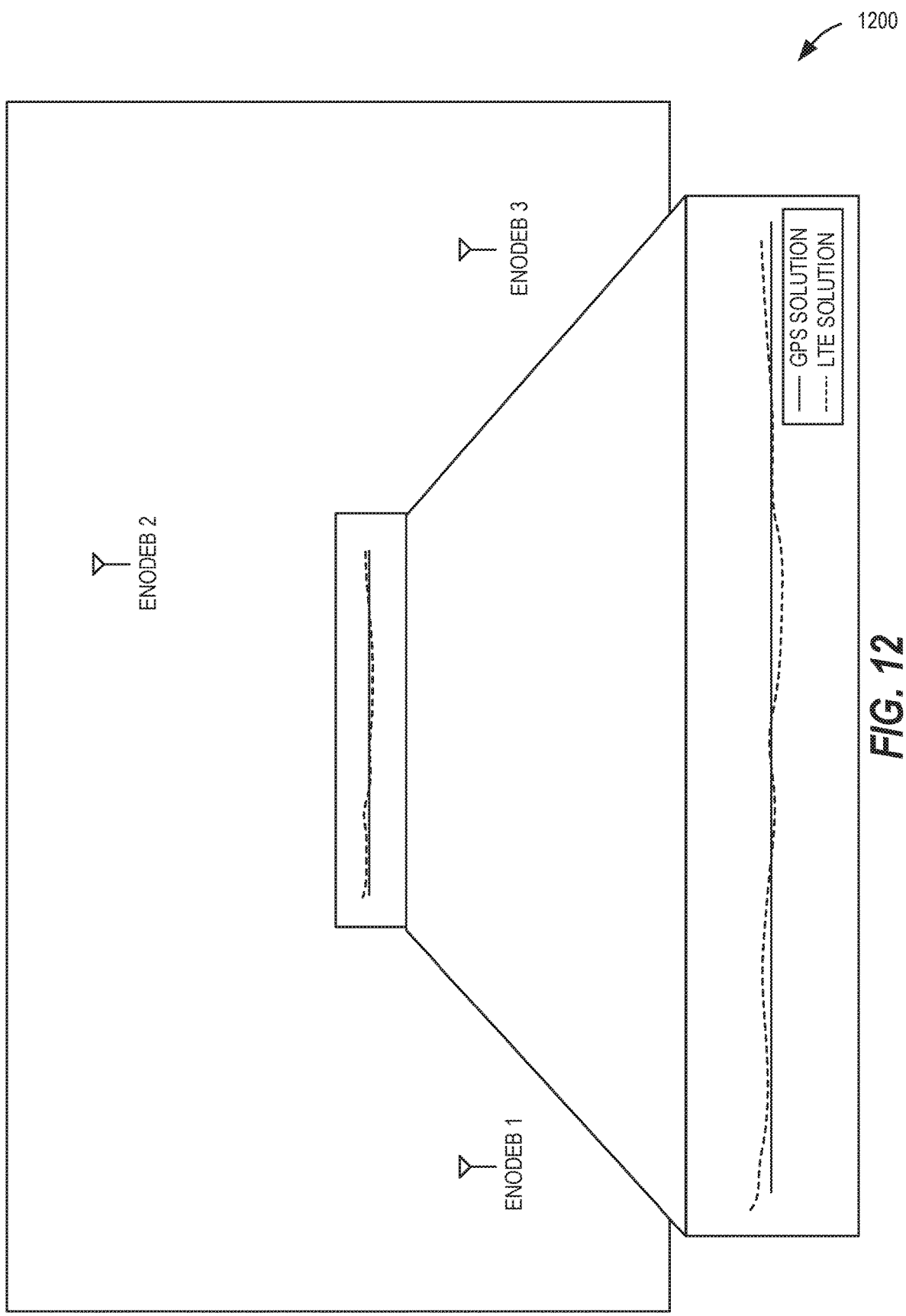
FIG. 12 is an experimental receiver trajectory map, in accordance with at least one embodiment.

FIG. 12 is an experimental receiver trajectory map 1200, in accordance with at least one embodiment. Map 1200 shows 3 eNodeBs tracked in an example experiment, including the eNodeBs listed in Table II:

TABLE II

| eNodeB characteristics | | | | |
|---|---|---|---|---|
| eNodeB | $f_c$ (MHz) | $N_{ID}^{Cell}$ | Bandwidth (MHz) | Number of antennas |
| 1 | 739 | 288 | 10 | 2 |
| 2 | 1955 | 216 | 20 | 2 |
| 3 | 739 | 232 | 10 | 2 |

The position states of these eNodeBs were previously mapped, and are shown on map 1200. As shown on map 1200, all measurements and trajectories were projected onto a two-dimensional (2-D) space, which shows the true and estimated receiver trajectories. Subsequently, only the horizontal position of the receiver was being estimated. As shown in FIG. 12, the navigation solution obtained from the LTE signals follows closely the navigation solution obtained using GPS signals. In this example, the root mean square (RMS) error between the GPS and LTE navigation solutions along the traversed 1.42 km trajectory was calculated to be 11.96 m with a standard deviation of 6.83 m and a maximum error of 40.42 m.

Map 1200 shows 3 eNodeBs tracked in an example experiment, however various numbers of nodes may be tracked to improve the navigation solution. To estimate the position of the receiver in a two-dimensional (2-D) plane using a static estimator, the pseudoranges to at least three eNodeBs are required and can be obtained by tracking the signal of each eNodeB. However, tracking all signals is computationally involved and can prohibit real-time implementation. The received signal from an eNodeB can be highly attenuated, and therefore it may not be possible to track all ambient SSSs. In an embodiment, the frequency reuse factor of six in the LTE CRS signals may be used to extract the pseudorange of multiple eNodeBs while tracking only one eNodeB.

The received symbol at the UE can be written as $$r(n) = r^{(1)}(n) + \sum_{u=2}^{U} r^{(u)}(n) + w(n),$$

where $r^{(1)}(n)$ is the received symbol from the main eNodeB, $r^{(u)}(n)$ is the received signal from the u-th eNodeB at time n, and w(n) is modeled as an additive white Gaussian noise with variance $\sigma_{IQ}^2$. Defining the received time delay of the u-th eNodeB as $\hat{d}^{(u)}(0)$, which in effect measures the TOA and the clock biases, the signal will be received in one of three possible scenarios. The first scenario happens when the difference of the distances to the main eNodeB and to the neighboring eNodeB is less than the duration of the CP. For a CP of length 4.69 μs, this difference must be less than 1406 m. In the second scenario, the difference is more than the length of a CP. In the third scenario, the neighboring eNodeB is closer to the receiver than the main eNodeB. In the second scenario, the neighboring eNodeBs are significantly far, and it is assumed that the received signals from these eNodeBs are highly attenuated. It is also assumed that the third scenario does not happen since the main eNodeB is defined as the eNodeB with the highest power, which is usually the closest eNodeB to the receiver.

Defining $n_d^{(u)}$, $n^{(u)}(0) - n^{(1)}(0)$ as the time delay difference between the u-th eNodeB and the main eNodeB, it can be concluded that for $0 \leq n_d^{(u)} \leq L_{CP}$, $$r^{(u)}(n) = r^{(u)}(n - n_d^{(u)})_{N_e}.$$

By taking the FFT of r(n) and using $R_i(k)$ and $r^{(u)}(n)$, the received signal in the frequency-domain becomes $$R(k) = H^{(1)}(k)Y^{(1)}(k) + \sum_{u=2}^{U} H^{(u)}(k)Y^{(u)}(k)e^{-j\frac{2\pi n_d^{(u)}}{N_c}} + W(k).$$

For the symbols carrying the CRS, Y is defined as $$Y_i^{(u)}(k) = \begin{cases} S_i^{(u)}(k), & \text{if } k \in N_{CRS}^{(u)}, \\ D_i^{(u)}(k), & \text{otherwise.} \end{cases}$$

Therefore, the CFR of the main eNodeB can be obtained from $$\hat{H}^{(1)}(k) = R(k)S^{(1)*}(k)$$
$$= H^{(1)}(k) + V^{(1)}(k),$$

for $k \in N_{CRS}^{(1)}$, and the estimated CFRs for other eNodeBs are obtained according to $$\hat{H}^{(u)}(k) = R(k)S^{(u)*}(k)$$
$$= H^{(u)}(k)e^{-\frac{j2\pi k n_d^{(u)}}{N_c}} + V^{(u)}(k),$$

for $k \in N_{CRS}^{(u)}$.

Subsequently, the CIRs are calculated using $$\hat{h}^{(1)}(n) = h^{(1)}(n) + v^{(1)}(n),$$

$$\hat{h}^{(u)}(n) = h^{(u)}(n - n_d^{(u)}) + v^{(u)}(n),$$

After obtaining $\hat{h}^{(u)}(n)$, the method proposed above can be exploited to determine the first peak of $\hat{h}^{(u)}(n)$, which represents $n_d^{(u)}$. The u-th eNodeB TOA can be calculated as $$d^{(u)}(0) = d^{(1)}(0) + n_d^{(u)}.$$

It is worth mentioning that in this method, the phase and frequency offsets of the neighboring eNodeBs are not tracked. One of the challenges in using this method is that it depends on the relative location of the main eNodeB and the neighboring eNodeB, and it is applicable only when the condition $0 \leq n_d^{(u)} \leq L_{CP}$ is satisfied.

Figure 13:
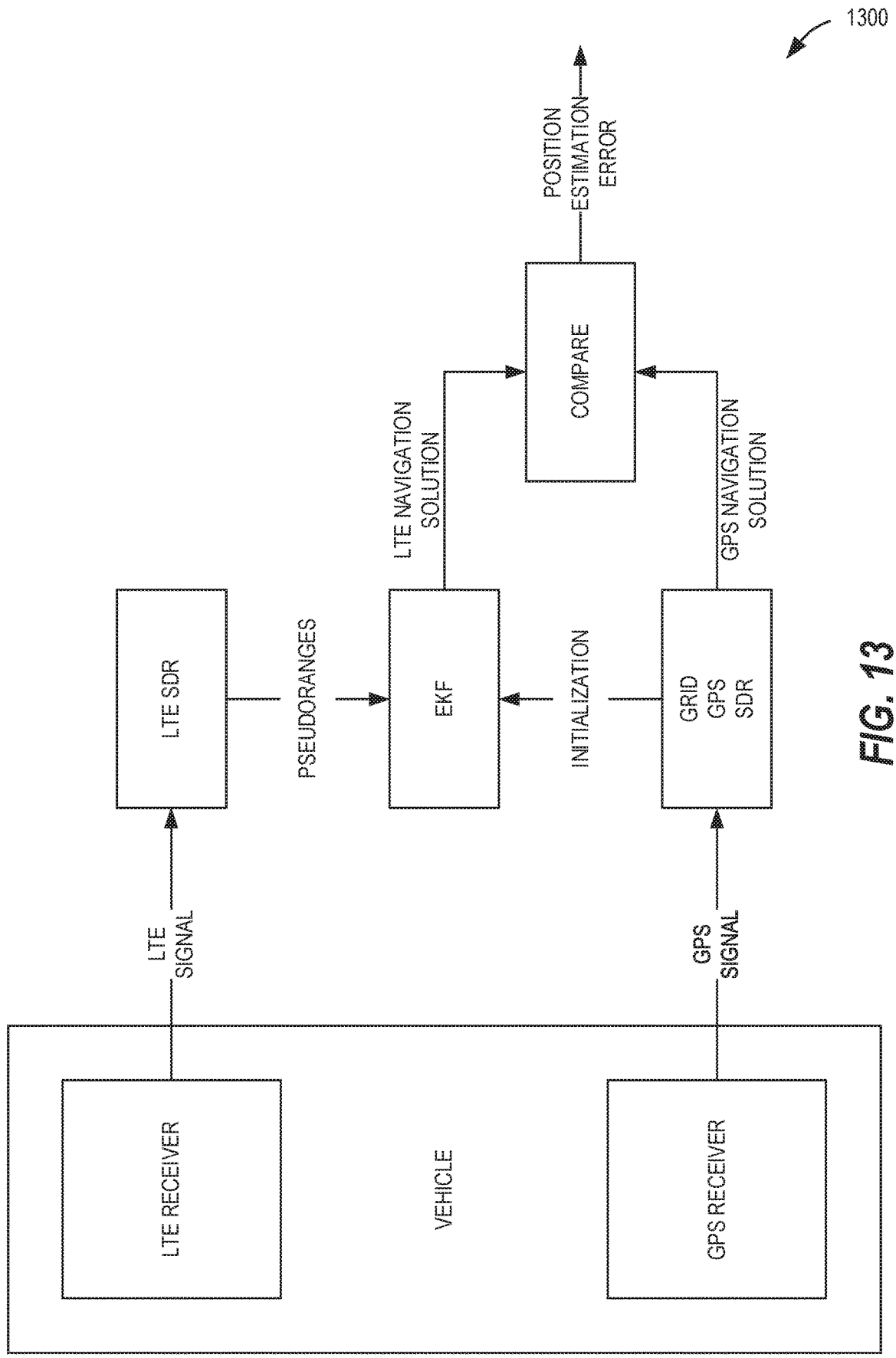
FIG. 13 is an extended Kalman filter block diagram, in accordance with at least one embodiment.

FIG. 13 is an extended Kalman filter block diagram 1300, in accordance with at least one embodiment. To improve upon solutions that model clock drift using a linear model, an extended Kalman filter (EKF) may be used to estimate on-the-fly the position of the receiver along with the difference of the clock biases between the receiver and each eNodeB. The block diagram 1300 includes an LTE receiver and GPS receiver, which may be mounted on a vehicle. The LTE receiver provides an LTE signal to an LTE SDR, such as described above. Similarly, the GPS receiver may provide a GPS signal to a GRID GPS SDR. The LTE SDR may generate and provide pseudoranges to the EKF, and the GPS SDR may generate and provide initialization data to the EKF. The EKF may use the pseudoranges and initialization data to generate an LTE navigation solution, and the GPS SDR may generate a GPS navigation solution. Both the LTE and GPS navigation solutions may be compared to calculate the estimation error.

Figure 14:
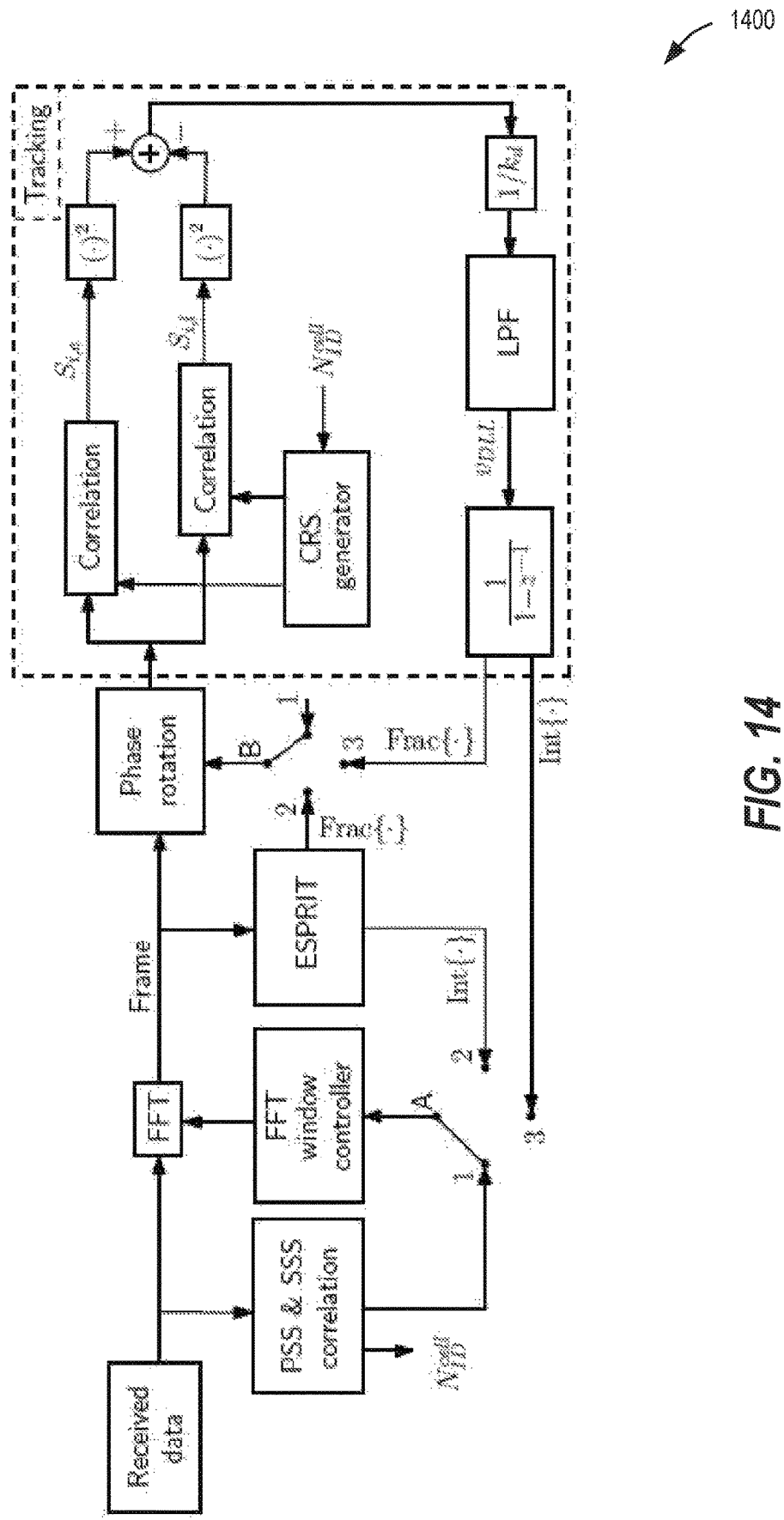
FIG. 14 is an LTE receiver architecture block diagram, in accordance with at least one embodiment.

FIG. 14 is an LTE receiver architecture block diagram 1400, in accordance with at least one embodiment. As it can be seen in FIG. 14, points A and B can be connected to the points 1, 2, or 3. These connections are assigned based on the stage in which the receiver is working. In the first stage, where A and B are connected to the points numbered 1, the receiver obtains a coarse estimate of the frame start time by acquiring the PSS and SSS. In the second stage, where A and B are connected to points numbered 2, the receiver refines the initial estimate using ESPRIT algorithm. In the third and final stage, where the points numbered 3 are connected to A and B, the receiver tracks the signal in which a fine estimate of the TOA is obtained.

Figure 15:
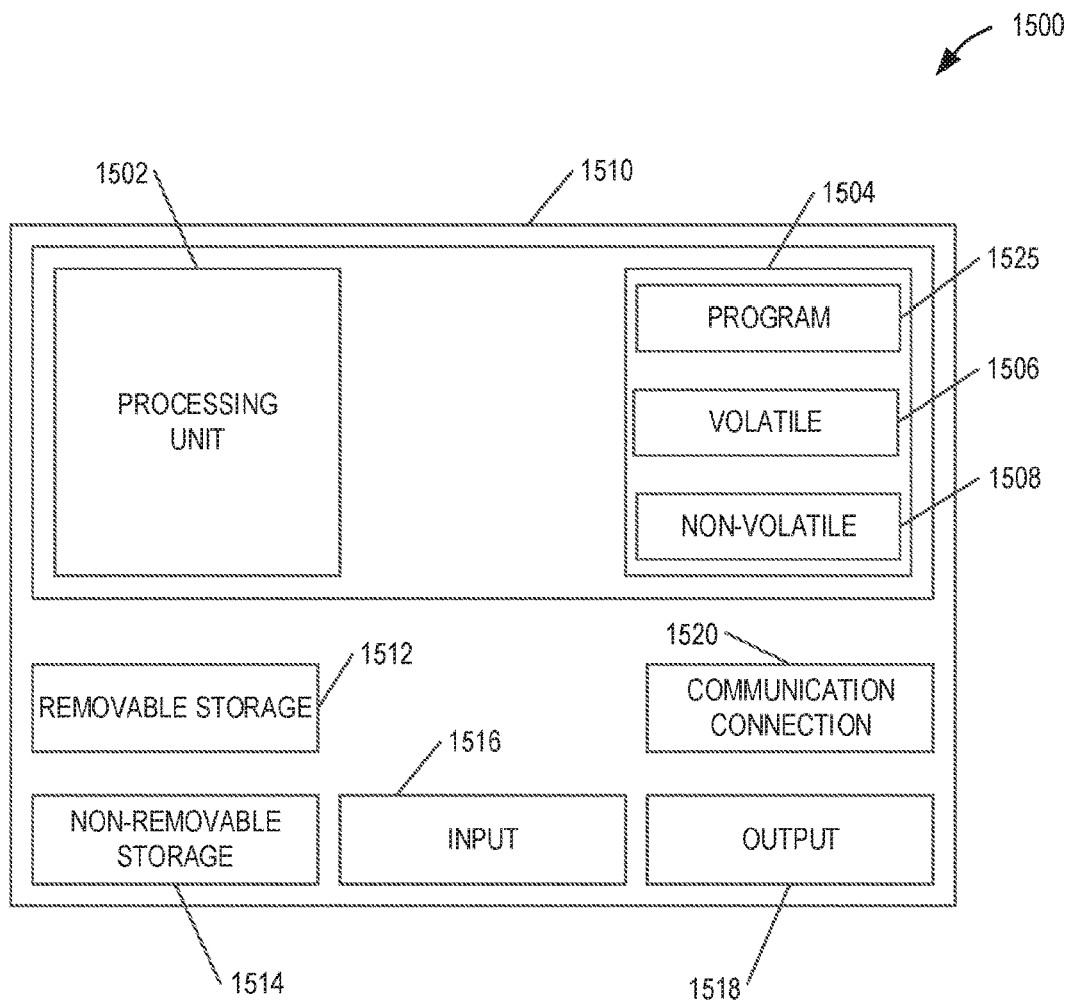
FIG. 15 is a block diagram of a computing device, according to an embodiment.

FIG. 15 is a block diagram of a computing device 1500, according to an embodiment. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 15 is an example of a client device that may invoke methods described herein over a network. In other embodiments, the computing device is an example of a computing device that may be included in or connected to a motion interactive video projection system, as described elsewhere herein. In some embodiments, the computing device of FIG. 15 is an example of one or more of the personal computer, smartphone, tablet, or various servers.

One example computing device in the form of a computer 1510, may include a processing unit 1502, memory 1504, removable storage 1512, and non-removable storage 1514. Although the example computing device is illustrated and described as computer 1510, the computing device may be in different forms in different embodiments. For example, the computing device may instead be a smartphone, a tablet, or other computing device including the same or similar elements as illustrated and described with regard to FIG. 15. Further, although the various data storage elements are illustrated as part of the computer 1510, the storage may include cloud-based storage accessible via a network, such as the Internet.

Returning to the computer 1510, memory 1504 may include volatile memory 1506 and non-volatile memory 1508. Computer 1510 may include or have access to a computing environment that includes a variety of computer-readable media, such as volatile memory 1506 and non-volatile memory 1508, removable storage 1512 and non-removable storage 1514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1510 may include or have access to a computing environment that includes input 1516, output 1518, and a communication connection 1520. The input 1516 may include one or more of a touchscreen, touchpad, mouse, keyboard, camera, and other input devices. The input 1516 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 1520 to connect to one or more remote computers, such as database servers, web servers, and other computing device. An example remote computer may include a personal computer (PC), server, router, network PC, a peer device or other common network node, or the like. The communication connection 1520 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 1502 of the computer 1510. A hard drive (magnetic disk or solid state), CD-ROM, and RAM are some examples of articles including a non-transitory computer-readable medium. For example, various computer programs 1525 or apps, such as one or more applications and modules implementing one or more of the methods illustrated and described herein or an app or application that executes on a mobile device or is accessible via a web browser, may be stored on a non-transitory computer-readable medium.

To better illustrate the method and apparatuses disclosed herein, a non-limiting list of embodiments is provided here.

Each of these non-limiting examples can stand on its own, or can be combined in various permutations or combinations with one or more of the other examples.

Conventional terms in the fields of computer vision have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A navigation system comprising:
a global navigation satellite solution (GNSS) receiver to receive a plurality of GNSS signals from a plurality of GNSS satellites;
a long term evolution (LTE) signal of opportunity (SOP) receiver to receive an SOP signal from at least one LTE transceiver station; and
a processor to:
determine a plurality of GNSS pseudorange measurements based on the received plurality of GNSS signals, the plurality of GNSS pseudorange measurements having an associated GNSS clock bias;
determine an SOP pseudorange measurement based on the received SOP signal, the SOP pseudorange measurement having an associated SOP clock bias; and
determine an estimated receiver position based on the SOP pseudorange measurement and the plurality of GNSS pseudorange measurements.

2. The system of claim 1, wherein determining the estimated receiver position includes tracking an LTE primary synchronization signal (PSS).

3. The system of claim 1, wherein:
determining the estimated receiver position includes tracking an LTE secondary synchronization signal (SSS); and
tracking the SSS is based on the processor tracking the PSS.

4. The system of claim 3, wherein the processor determining the estimated receiver position includes determining a coarse frame start estimate based on the SSS and PSS.

5. The system of claim 4, wherein the processor determining the estimated receiver position includes determining an initial navigation estimate based on an ESPRIT algorithm.

6. The system of claim 5, wherein the processor determining the estimated receiver position includes determining a fine time-of-arrival estimate.

7. The system of claim 1, wherein determining the estimated receiver position includes applying an extended Kalman filter to estimate the plurality of receiver-SOP clock bias differences.

8. The system of claim 1, wherein determining the estimated receiver position includes tracking a second SOP signal based on the received SOP signal.

9. The system of claim 1, further including a cell-specific reference signal (CRS) receiver to receive a CRS, wherein determining the estimated receiver position includes tracking a channel impulse response (CIR) based on the CRS.

10. The system of claim 1, the processor further to:
determine that the received plurality of GNSS signals is unavailable; and
determine an updated estimated receiver position based on the SOP pseudorange measurement, the updated estimated receiver position determined without requiring the plurality of GNSS pseudorange measurements.

11. A navigation method comprising:
receiving a plurality of GNSS signals from a plurality of GNSS satellites at a global navigation satellite solution (GNSS) receiver;
receiving an SOP signal from at least one LTE transceiver station at a long term evolution (LTE) signal of opportunity (SOP) receiver;
determining a plurality of GNSS pseudorange measurements based on the received plurality of GNSS signals, the plurality of GNSS pseudorange measurements having an associated GNSS clock bias;
determining an SOP pseudorange measurement based on the received SOP signal, the SOP pseudorange measurement having an associated SOP clock bias; and
determining an estimated receiver position based on the SOP pseudorange measurement and the plurality of GNSS pseudorange measurements.

12. The method of claim 11, wherein determining the estimated receiver position includes tracking an LTE primary synchronization signal (PSS).

13. The method of claim 11, wherein:
determining the estimated receiver position includes tracking an LTE secondary synchronization signal (SSS); and
tracking the SSS is based on the processor tracking the PSS.

14. The method of claim 13, wherein determining the estimated receiver position includes determining a coarse frame start estimate based on the SSS and PSS.

15. The method of claim 14, wherein determining the estimated receiver position includes determining an initial navigation estimate based on an ESPRIT algorithm.

16. The method of claim 15, wherein determining the estimated receiver position includes determining a fine time-of-arrival estimate.

17. The method of claim 11, wherein determining the estimated receiver position includes applying an extended Kalman filter to estimate the plurality of receiver-SOP clock bias differences.

18. The method of claim 11, wherein determining the estimated receiver position includes tracking a second SOP signal based on the received SOP signal.

19. The method of claim 11, further including a cell-specific reference signal (CRS) receiver to receive a CRS, wherein determining the estimated receiver position includes tracking a channel impulse response (CIR) based on the CRS.

20. The method of claim 11, further including:
determining that the received plurality of GNSS signals is unavailable; and
determining an updated estimated receiver position based on the SOP pseudorange measurement, the updated estimated receiver position determined without requiring the plurality of GNSS pseudorange measurements.

* * * * *